US011190302B2

(12) United States Patent
Ren et al.

(10) Patent No.: US 11,190,302 B2
(45) Date of Patent: Nov. 30, 2021

(54) COMMUNICATION METHOD AND APPARATUS THEREFOR

(71) Applicant: HUAWEI TECHNOLOGIES CO., LTD., Guangdong (CN)

(72) Inventors: Haibao Ren, Shanghai (CN); Yuanjie Li, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/712,105

(22) Filed: Dec. 12, 2019

(65) Prior Publication Data

US 2020/0119858 A1 Apr. 16, 2020

Related U.S. Application Data

(63) Continuation of application No. PCT/CN2018/091690, filed on Jun. 15, 2018.

(30) Foreign Application Priority Data

Jun. 16, 2017 (CN) .......................... 201710462236.0

(51) Int. Cl.
*H04W 4/00* (2018.01)
*H04L 1/18* (2006.01)
(Continued)

(52) U.S. Cl.
CPC ....... *H04L 1/1819* (2013.01); *H04W 72/0466* (2013.01); *H04W 72/1289* (2013.01); *H04W 80/02* (2013.01)

(58) Field of Classification Search
CPC ... H04L 1/1819; H04L 1/1896; H04L 1/1864; H04L 1/1822; H04L 1/0063;
(Continued)

(56) References Cited

U.S. PATENT DOCUMENTS 8,929,319 B2 * 1/2015 Anderson ............. H04L 5/0037
370/329
10,588,124 B2 * 3/2020 Chen ................. H04W 72/0446
(Continued)

FOREIGN PATENT DOCUMENTS

CN          1917416 A        2/2007
CN        101005343 A        7/2007
(Continued)

OTHER PUBLICATIONS

Office Action dated Sep. 3, 2020, issued in counterpart of Chinese Patent Application No. 201710462236.0, with English Translation. (20 pages).

(Continued)

*Primary Examiner* — Mahendra R Patel
(74) *Attorney, Agent, or Firm* — Westerman, Hattori, Daniels & Adrian, LLP

(57) ABSTRACT

A communication method and an apparatus is provided. The method includes: determining, by a first network device for a first carrier, association information between a first resource and at least one of a first HARQ entity, a first MAC entity, or a first RLC entity, and sending configuration information to a terminal device, where the configuration information includes the association information between the first resource and the at least one of the first HARQ entity, the first MAC entity, or the first RLC entity; and receiving, by the terminal device, the configuration information, receiving first data, determining that the first data corresponds to the first resource, and determining, based on the configuration information and the first data that corresponds to the first resource, at least one of the first HARQ entity, the first MAC entity, or the first RLC entity corresponding to the first data, HARQ performance is ensured.

19 Claims, 9 Drawing Sheets

(51) Int. Cl.
*H04W 72/04* (2009.01)
*H04W 72/12* (2009.01)
*H04W 80/02* (2009.01)

(58) Field of Classification Search
CPC ............... H04L 1/1812; H04L 1/1845; H04W 72/0466; H04W 72/1289; H04W 80/02; H04W 72/04; H04W 72/12; H04W 72/0453; H04W 72/1278; H04W 72/042
USPC ........................................................ 370/329
See application file for complete search history.

(56) References Cited

U.S. PATENT DOCUMENTS

| | | | |
|---|---|---|---|
| 2009/0172490 A1* | 7/2009 | Shinohara | H04L 1/1838 714/748 |
| 2011/0134829 A1* | 6/2011 | Chen | H04L 1/1822 370/328 |
| 2012/0082096 A1* | 4/2012 | Cave | H04L 1/1848 370/328 |
| 2014/0056238 A1* | 2/2014 | Nammi | H04W 72/042 370/329 |
| 2014/0133446 A1* | 5/2014 | Liu | H04W 88/12 370/329 |
| 2014/0161002 A1* | 6/2014 | Gauvreau | H04L 1/1893 370/280 |
| 2014/0301362 A1* | 10/2014 | Koskinen | H04L 1/1838 370/331 |
| 2014/0341189 A1* | 11/2014 | Yang | H04W 36/0058 370/331 |
| 2015/0016318 A1* | 1/2015 | Lee | H04L 5/14 370/280 |
| 2015/0163822 A1* | 6/2015 | Guo | H04W 72/121 370/329 |
| 2015/0334697 A1* | 11/2015 | Song | H04W 68/005 455/450 |
| 2016/0029361 A1* | 1/2016 | Lu | H04L 61/6022 370/329 |
| 2016/0095133 A1* | 3/2016 | Hwang | H04W 8/005 370/329 |
| 2016/0226643 A1* | 8/2016 | Mallik | H04L 1/0089 |
| 2017/0064534 A1* | 3/2017 | Loehr | H04W 72/0413 |
| 2017/0181062 A1* | 6/2017 | Kim | H04W 48/10 |
| 2017/0295509 A1* | 10/2017 | Lee | H04W 24/10 |
| 2017/0332213 A1* | 11/2017 | Xu | H04W 4/08 |
| 2020/0304968 A1* | 9/2020 | Lee | H04W 52/0216 |

FOREIGN PATENT DOCUMENTS

| | | | | |
|---|---|---|---|---|
| CN | 101350708 A | * | 1/2009 | |
| CN | 101350708 A | | 1/2009 | |
| CN | 101461143 A | | 6/2009 | |
| KR | 20090071877 A | | 7/2009 | |
| WO | 2008104099 A1 | | 9/2008 | |
| WO | WO-2008104099 A1 | * | 9/2008 | ......... H03M 13/356 |
| WO | WO-2009009964 A1 | * | 1/2009 | ........... H04L 1/1812 |
| WO | WO-2016145655 A1 | * | 9/2016 | ............. H04W 72/04 |

OTHER PUBLICATIONS

MediaTek Inc,"Design of NR MAC layer to support multiple numerologies",3GPP TSG-HAN WG2 NR Tdoc R2-1700229,Spokane, USA, 17 Jan. 19, 2017,Total 4 Pages.
Extended Search Report dated May 28, 2020, issued in counterpart EP Application No. 18817812.3 (10 pages).
International Search Report dated Sep. 27, 2018, issued in counterpart application No. PCT/CN2018/091690, with English translation. (17 pages).

* cited by examiner

COMMUNICATION METHOD AND APPARATUS THEREFOR

CROSS-REFERENCE TO RELATED APPLICATIONS

This application is a continuation of International Application No. PCT/CN2018/091690, filed on Jun. 15, 2018, which claims priority to Chinese Patent Application No. 201710462236.0, filed on Jun. 16, 2017, The disclosures of the aforementioned applications are hereby incorporated by reference in their entireties.

TECHNICAL FIELD

This application relates to the field of communications technologies, and in particular, to a communication method and an apparatus therefor.

BACKGROUND

A hybrid automatic repeat request (HARQ) is a technology formed by combining a forward error correction (FEC) code and an automatic repeat request (ARQ). When decoding fails, a receiver stores received data and requires a sender to retransmit the data, and the receiver combines the retransmitted data and the previously received data and then decodes the data. The HARQ can efficiently compensate for a bit error caused by link adaptation, thereby increasing a data transmission rate, and reducing a data transmission delay.

Data is jointly sent by a plurality of base stations, so that a system capacity can be improved, and transmission reliability can be improved. For example, in non-coherent transmission, different base stations send independently pre-coded data to same user equipment. During implementation, different base stations are connected by using an X2 interface. The X2 interface may be a data packet transmission protocol carried over the internet protocol (IP). Because a delay or bandwidth of the X2 interface is limited, ideal information exchange between the base stations cannot be implemented. In this case, each base station may independently perform data scheduling, indicate a scheduling result of a terminal device by using downlink control information, and send scheduled data through a physical downlink data channel. The downlink control information may be abbreviated as DCI (downlink control information), and the physical downlink data channel may be abbreviated as PDSCH (physical downlink shared channel).

In this way, the terminal device may receive, in a same scheduling time unit, data flows that are from different base stations and that are transmitted on a same carrier. Transmission of the data flows may be scheduled by using more than one physical downlink control channel, and the physical downlink control channel may be abbreviated as PDCCH (physical downlink control channel).

In an inter-frequency multi-connectivity scenario, a user plane performs offloading at a packet data convergence protocol (PDCP) layer, different connections belong to carriers of different frequencies, different connections correspond to different cell identifiers (identification, ID), and each connection has an independent protocol stack, to be specific, an independent radio link control (RLC) layer, medium access control (MAC) layer, and physical layer. A PDCCH of a different connection schedules only a PDSCH of the connection. Therefore, an HARQ entity of a corresponding MAC layer may be determined by using data received at a physical layer of a receive end.

In a carrier aggregation scenario, a control channel of one carrier may schedule a PDSCH of another carrier, but in the DCI, an HARQ process to which data scheduled by using the DCI belongs may be obtained by using an HARQ process indication field, and a carrier to which the data scheduled by using the DCI belongs may be obtained by using a carrier indication field. Further, an HARQ entity of a MAC layer corresponding to the data may be determined.

However, when a plurality of data flows transmitted on a same carrier are scheduled by more than one physical downlink control channels, how to determine an HARQ entity, a MAC entity, or an RLC entity corresponding to received data is a problem that urgently needs to be resolved.

SUMMARY

Embodiments of this application provide a communication method and an apparatus therefor, so that a terminal device can determine an HARQ entity, a MAC entity, or an RLC entity corresponding to received data when a plurality of data flows transmitted on a same carrier are scheduled by more than one physical downlink control channels, thereby ensuring HARQ performance.

According to a first aspect, an embodiment of this application provides a communication method, including:
determining, by a first network device for a first carrier, association information between a first resource and at least one of a first HARQ entity, a first MAC entity, or a first RLC entity; and sending, by the first network device, configuration information to a terminal device, where the configuration information includes the association information between the first resource and the at least one of the first HARQ entity, the first MAC entity, or the first RLC entity.

According to a second aspect, an embodiment of this application provides a communications apparatus, including a unit or a means configured to perform the steps in the first aspect.

According to a third aspect, an embodiment of this application provides a communications apparatus, including at least one processing element and at least one storage element. The at least one storage element is configured to store a program and data. The at least one processing element is configured to perform the method provided in the first aspect of the embodiments of this application.

According to a fourth aspect, an embodiment of this application provides a communications apparatus, including at least one processing element (or chip) configured to perform the method according to the first aspect.

According to a fifth aspect, an embodiment of this application provides a communication method program. When the program is executed by a processor, the program is used to perform the method according to the first aspect.

According to a sixth aspect, an embodiment of this application provides a program product, for example, a computer-readable storage medium, including the program according to the fifth aspect.

It can be learned that in the foregoing aspects, the first network device binds at least one of the first HARQ entity, the first MAC entity, or the first RLC entity to the first resource, so that the terminal device may determine, based on a binding relationship and the first resource, at least one of the first HARQ entity, the first MAC entity, or the first RLC entity corresponding to first data sent by the first network device. In this way, when a plurality of network devices perform data scheduling and data transmission for a same carrier, the terminal device may distinguish between at least one of an HARQ entity, a MAC entity, or an RLC entity corresponding to data sent by each network device.

With reference to the first aspect to the sixth aspect, in a possible implementation, the first resource may be used to distinguish between other network devices or control channels scheduled by other network devices, and may include at least one of a first control channel resource, a first antenna port, a first control channel scrambling resource, a first transport block, a first HARQ process, a first group of HARQ processes, or a first connection identifier.

With reference to the first aspect to the sixth aspect, in a possible implementation, the first resource includes a first group of HARQ processes. In this case, the association information between the first resource and the at least one of the first HARQ entity, the first MAC entity, or the first RLC entity may include a correspondence between a group identifier of the first group of HARQ processes and at least one of the first HARQ entity, the first MAC entity, or the first RLC entity.

The first network device further sends the group identifier of the first group of HARQ processes, where the group identifier of the first group of HARQ processes is used to indicate the first group of HARQ processes, so that the terminal device determines, based on the group identifier of the first group of HARQ processes and the configuration information, at least one of the first HARQ entity, the first MAC entity, or the first RLC entity corresponding to the first data.

Different network devices may correspond to different HARQ process groups, or may correspond to a same HARQ process group. This is determined based on a specific situation.

With reference to the first aspect to the sixth aspect, in a possible implementation, the first resource includes a first HARQ process. In this case, the association information between the first resource and the at least one of the first HARQ entity, the first MAC entity, or the first RLC entity may include a correspondence between a process identification of the first HARQ process and the at least one of the first HARQ entity, the first MAC entity, or the first RLC entity.

The first network device further sends the process identification of the first HARQ process, where the process identification of the first HARQ process is used to indicate the first HARQ process, so that the terminal device determines, based on the process identification of the first HARQ process and the configuration information, at least one of the first HARQ entity, the first MAC entity, or the first RLC entity corresponding to the first data.

Different network devices may correspond to different HARQ process identifications, or may correspond to a same HARQ process identification. This is determined based on a specific situation.

With reference to the first aspect to the sixth aspect, in a possible implementation, the first resource includes a first antenna port, and the first antenna port may be one or more antenna ports. In this case, the association information between the first resource and the at least one of the first HARQ entity, the first MAC entity, or the first RLC entity may include a correspondence between the first antenna port and the at least one of the first HARQ entity, the first MAC entity, or the first RLC entity.

The first network device further sends indication information of the first antenna port, where the indication information of the first antenna port is used to indicate the first antenna port, so that the terminal device determines, based on the first antenna port and the configuration information, at least one of the first HARQ entity, the first MAC entity, or the first RLC entity corresponding to the first data.

Different network devices correspond to different antenna ports. The terminal device may identify, by using an antenna port, a network device sending data, to determine, based on the configuration information, at least one of an HARQ entity, a MAC entity, or an RLC entity corresponding to the data.

With reference to the first aspect to the sixth aspect, in a possible implementation, the first resource includes a first transport block, and different transport blocks correspond to different transport block codewords. In this case, the association information between the first resource and the at least one of the first HARQ entity, the first MAC entity, or the first RLC entity may include a correspondence between the first transport block (a codeword corresponding to the first transport block) and the at least one of the first HARQ entity, the first MAC entity, or the first RLC entity.

The first network device further sends indication information of the first transport block, where the indication information of the first transport block is used to indicate the first transport block (the codeword corresponding to the first transport block), so that the terminal device determines, based on the first transport block (the codeword corresponding to the first transport block) and the configuration information, at least one of the first HARQ entity, the first MAC entity, or the first RLC entity corresponding to the first data.

Different network devices may use different transport blocks. The terminal device may identify, by using a codeword corresponding to a transport block, a network device sending data, to determine, based on the configuration information, at least one of an HARQ entity, a MAC entity, or an RLC entity corresponding to the data.

With reference to the first aspect to the sixth aspect, in a possible implementation, the first resource includes a first connection identifier. In this case, the association information between the first resource and the at least one of the first HARQ entity, the first MAC entity, or the first RLC entity may include a correspondence between the first connection identifier and the at least one of the first HARQ entity, the first MAC entity, or the first RLC entity.

The first network device further sends indication information of the first connection identifier, where the indication information of the first connection identifier is used to indicate the first connection identifier, so that the terminal device determines, based on the first connection identifier and the configuration information, at least one of the first HARQ entity, the first MAC entity, or the first RLC entity corresponding to the first data. The indication information of the first connection identifier may be the first connection identifier, or may be an index of the first connection identifier.

Different network devices correspond to different connection identifiers. The terminal device may identify, by using a connection identifier, a network device sending data, to determine, based on the configuration information, at least one of an HARQ entity, a MAC entity, or an RLC entity corresponding to the data.

With reference to the first aspect to the sixth aspect, in a possible implementation, the first network device receives third data from the terminal device, where the third data uses at least one resource of the first HARQ process, the first group of HARQ processes, the first antenna port, the first transport block, or the first connection identifier.

With reference to the first aspect to the sixth aspect, in a possible implementation, the first network device sends the first data to the terminal device by using at least one resource of the first HARQ process, the first group of HARQ processes, the first antenna port, the first transport block, or the first connection identifier.

With reference to the first aspect to the sixth aspect, in a possible implementation, the first resource includes a first control channel scrambling resource. In this case, the association information between the first resource and the at least one of the first HARQ entity, the first MAC entity, or the first RLC entity may include a correspondence between the first control channel scrambling resource and the at least one of the first HARQ entity, the first MAC entity, or the first RLC entity.

The first network device may perform cyclic redundancy check scrambling on a first control channel by using the first control channel scrambling resource. If a descrambling resource used by the terminal device is the same as the first control channel scrambling resource, the first control channel may be descrambled, to obtain the first data scheduled by the first control channel.

A control channel scrambling resource may be a cell radio network temporary identifier. Different network devices may use different cell radio network temporary identifiers. The terminal device may identify a network device by descrambling a cell radio network temporary identifier of a control channel, to determine at least one of an HARQ entity, a MAC entity, or an RLC entity corresponding to data scheduled by the control channel.

With reference to the first aspect to the sixth aspect, in a possible implementation, the first resource includes a first control channel resource. In this case, the association information between the first resource and the at least one of the first HARQ entity, the first MAC entity, or the first RLC entity may include a correspondence between the first control channel resource and the at least one of the first HARQ entity, the first MAC entity, or the first RLC entity.

The first network device may send a first control channel to the terminal device by using the first control channel resource, so that the terminal device determines, based on a resource occupied by the first control channel and the configuration information, at least one of the first HARQ entity, the first MAC entity, or the first RLC entity corresponding to the first data scheduled by the first control channel.

Different control channel resources may be configured for different network devices. When detecting a control channel resource, the terminal device may distinguish between different network devices based on different resources occupied by different control channels, and further, determine at least one of an HARQ entity, a MAC entity, or an RLC entity corresponding to data scheduled by a control channel.

The control channel resource may include at least one of resources such as a time-frequency resource of the control channel, an aggregation level of search space, and a transmission type.

With reference to the first aspect to the sixth aspect, in a possible implementation, the first network device determines, for the first carrier, association information between a second resource and at least one of a second HARQ entity, a second MAC entity, or a second RLC entity. In this case, the configuration information further includes the association information between the second resource and the at least one of the second HARQ entity, the second MAC entity, or the second RLC entity. The second resource and the first resource are resources of a same type, but the second resource is different from the first resource. The first resource corresponds to the first network device, and the second resource corresponds to a second network device.

With reference to the first aspect to the sixth aspect, in a possible implementation, the first network device sends, to the second network device, the association information between the second resource and the at least one of the second HARQ entity, the second MAC entity, or the second RLC entity. The second network device performs data scheduling or data transmission for the terminal device on the first carrier.

With reference to the first aspect to the sixth aspect, in a possible implementation, the first network device receives, from the second network device, the association information, for the first carrier, between the second resource and the at least one of the second HARQ entity, the second MAC entity, or the second RLC entity, so that the first network device determines the association information, for the first carrier, between the first resource and the at least one of the first HARQ entity, the first MAC entity, or the first RLC entity.

With reference to the first aspect to the sixth aspect, in a possible implementation, the first network device sends, to the second network device, the association information, for the first carrier, between the first resource and the at least one of the first HARQ entity, the first MAC entity, or the first RLC entity, so that the second network device determines, the association information, for the first carrier, between the second resource and the at least one of the second HARQ entity, the second MAC entity, or the second RLC entity.

According to a seventh aspect, an embodiment of this application provides a communication method, including:

receiving, by a terminal device, configuration information, where the configuration information includes association information, for a first carrier, between a first resource and at least one of a first HARQ entity, a first MAC entity, or a first RLC entity;

receiving, by the terminal device, first data, and determining that the first data corresponds to the first resource; and determining, by the terminal device based on the configuration information and the first resource that corresponds to the first data, the at least one of the first HARQ entity, the first MAC entity, or the first RLC entity corresponding to the first data.

According to an eighth aspect, an embodiment of this application provides a communications apparatus, including a unit or a means (means) configured to perform the steps in the seventh aspect.

According to a ninth aspect, an embodiment of this application provides a communications apparatus, including at least one processing element and at least one storage element. The at least one storage element is configured to store a program and data. The at least one processing element is configured to perform the method provided in the seventh aspect of the embodiments of this application.

According to a tenth aspect, an embodiment of this application provides a communications apparatus, including at least one processing element (or chip) configured to perform the method according to the seventh aspect.

According to an eleventh aspect, an embodiment of this application provides a communication method program. When the program is executed by a processor, the program is used to perform the method according to the seventh aspect.

According to a twelfth aspect, an embodiment of this application provides a program product, for example, a computer-readable storage medium, including the program according to the eleventh aspect.

It can be learned that, according to the seventh aspect to the twelfth aspect, the terminal device determines, based on the configuration information and the first data that corresponds to the first resource, at least one of the first HARQ entity, the first MAC entity, or the first RLC entity corresponding to the first data, to determine at least one of an HARQ entity, a MAC entity, or an RLC entity corresponding to data transmitted or scheduled by different network devices, thereby ensuring HARQ performance.

With reference to the seventh aspect to the twelfth aspect, in a possible implementation, the first resource includes a first group of HARQ processes. The terminal device determines the first group of HARQ processes based on a received group identifier of the first group of HARQ processes, where the group identifier of the first group of HARQ processes is used to indicate the first group of HARQ processes, so as to identify the first group of HARQ processes, and further, determine at least one of the first HARQ entity, the first MAC entity, or the first RLC entity corresponding to the first group of HARQ processes.

With reference to the seventh aspect to the twelfth aspect, in a possible implementation, the first resource includes a first HARQ process. The terminal device determines the first HARQ process based on a received process identification of the first HARQ process, where the process identification of the first HARQ process is used to indicate the first HARQ process, so as to identify the first HARQ process, and further, determine at least one of the first HARQ entity, the first MAC entity, or the first RLC entity corresponding to the first HARQ process.

With reference to the seventh aspect to the twelfth aspect, in a possible implementation, the first resource includes a first antenna port. The terminal device determines the first antenna port based on received indication information of the first antenna port, where the indication information of the first antenna port is used to indicate the first antenna port, so as to identify the first antenna port, and further, determine at least one of the first HARQ entity, the first MAC entity, or the first RLC entity corresponding to the first antenna port.

With reference to the seventh aspect to the twelfth aspect, in a possible implementation, the first resource includes a first transport block. The terminal device determines the first transport block based on received indication information of the first transport block, where the indication information of the first transport block is used to indicate the first transport block, so as to identify the first transport block, and further, determine at least one of the first HARQ entity, the first MAC entity, or the first RLC entity corresponding to the first transport block.

With reference to the seventh aspect to the twelfth aspect, in a possible implementation, the first resource includes a first connection identifier. The terminal device determines the first connection identifier based on received indication information of the first connection identifier, where the indication information of the first connection identifier is used to indicate the first connection identifier, so as to identify the first connection identifier, and further, determine at least one of the first HARQ entity, the first MAC entity, or the first RLC entity corresponding to the first connection identifier.

With reference to the seventh aspect to the twelfth aspect, in a possible implementation, the terminal device receives the first data by using at least one resource of the first HARQ process, the first group of HARQ processes, the first antenna port, the first transport block, or the first connection identifier.

With reference to the seventh aspect to the twelfth aspect, in a possible implementation, the first resource includes a first control channel scrambling resource. The terminal device determines the first control channel scrambling resource based on a resource for descrambling a first control channel, and receives the first data based on scheduling of the first control channel corresponding to the first control channel scrambling resource. The resource for descrambling the first control channel may be a cell radio network temporary identifier.

With reference to the seventh aspect to the twelfth aspect, in a possible implementation, the first resource includes a first control channel resource. The terminal device determines the first control channel resource based on a resource occupied by a received first control channel, and receives the first data based on scheduling of the first control channel corresponding to the first control channel resource. The resource occupied by the first control channel may include at least one of resources such as a time-frequency resource of blind detection, an aggregation level of search space, and a transmission type.

With reference to the seventh aspect to the twelfth aspect, in a possible implementation, the configuration information further includes association information, for the first carrier, between a second resource and at least one of a second HARQ entity, a second MAC entity, or a second RLC entity. The second resource and the first resource are resources of a same type, but the second resource is different from the first resource. The first resource corresponds to the first network device, and the second resource corresponds to a second network device.

The first resource in this application may be a resource corresponding to downlink transmission, or may be a resource corresponding to uplink transmission. Similarly, the second resource may be a resource corresponding to downlink transmission, or may be a resource corresponding to uplink transmission. When data is uplink data, the first resource is the resource corresponding to the uplink transmission. When data is downlink data, the first resource is the resource corresponding to the downlink transmission.

It may be understood that the description herein is merely for brief description, and is unrelated to whether the resource corresponding to the downlink transmission is the same as the resource corresponding to the uplink transmission.

BRIEF DESCRIPTION OF DRAWINGS

To describe the technical solutions in embodiments of this application or in the background more clearly, the following briefly describes the accompanying drawings required for describing the embodiments of this application or the background.

DESCRIPTION OF EMBODIMENTS

The following describes embodiments of this application with reference to the accompanying drawings in the embodiments of this application.

Figure 1:
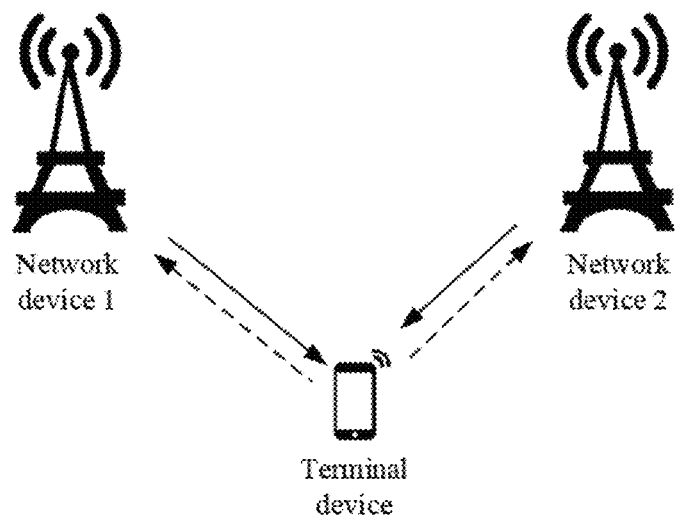
FIG. 1 is a schematic diagram of an application scenario according to this application.

The embodiments of this application may be applied to a wireless communications system. The wireless communications system usually includes cells, and each cell includes one base station (BS). As shown in FIG. 1, a base station may provide a communication service for a plurality of terminal devices, and a plurality of base stations may provide a communications service for a same terminal device. The base station includes a baseband unit (BBU) and a radio frequency unit (RU). The radio frequency unit may be a remote radio frequency unit (RRU). The BBU and the RU may be placed in different places. For example, the RU is remote and is placed in an open area with heavy traffic, and the BBU is placed in a central equipment room. Alternatively, the BBU and the RU may be placed in a same equipment room. Alternatively, the BBU and the RU may be different components in a same rack.

It should be noted that the wireless communications system in the embodiments of this application includes, but is not limited to, a narrow band-internet of things (NB-IoT) system, a global system for mobile communications (GSM) an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, a fifth generation (5G) mobile communications system, or a future mobile communications system.

The base station in the embodiments of this application is an apparatus that is deployed in a radio access network and that is configured to provide a wireless communication function for the terminal device. The base station may include macro base stations, micro base stations (also referred to as small cells), relay nodes, access points, transmission receiver points (TRP), and the like in various forms. In systems using different radio access technologies, names of devices having a base station function may be different. For example, in an LTE system, the device is referred to as an evolved NodeB (eNB, or eNodeB); in a 3rd generation (3G) system, the device is referred to as a NodeB (NodeB, NB); in a fifth generation mobile communications system, the device is referred to as a gNodeB (gNodeB, gNB), a transmission point (TP), a TRP, or the like. For ease of description, in all the embodiments of this application, the foregoing apparatuses that provide a wireless communication function for the terminal device are generally referred to as network devices. The network device may be the foregoing base station (also referred to as an access network device), or may be a board or a chip, such as a communications chipset, that may be disposed in the base station and that is configured to provide a wireless communication function for the terminal device.

The terminal device in the embodiments of this application may include various user equipments (user equipment, UE), hand-held devices, vehicle-mounted devices, drone devices, customer-premises equipments (CPE), wearable devices, or computing devices that have a wireless communication function, or other processing devices connected to a wireless modem. Alternatively, the terminal device may be a smart home device such as a refrigerator, a television, an air conditioner, or an electricity meter; may be a traffic device such as a car, a bicycle, an electric vehicle, an airplane, or a ship; or may be a device that can perform wireless communication, such as a smart robot or a workshop device. The terminal device may also be referred to as a mobile station (MS) or a terminal, or may include a subscriber unit (subscriber unit), a cellular phone, a smartphone a wireless data card, a personal digital assistant (PDA) computer, a tablet computer, a wireless modem, a hand-held device a laptop computer, a machine type communication (MTC) terminal, a computer having wireless receiving and sending functions, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety (transportation safety), a wireless terminal in a smart city, a wireless terminal in a smart home, or the like. For ease of description, the devices described above are collectively referred to as terminal devices in all the embodiments of this application. The terminal device may be the foregoing device, or may be a board or a chip, such as a communications chipset, that is disposed in the device and that is configured to implement a wireless communication function of the foregoing device.

The embodiments of this application may be applied to a coordinated multi-point transmission scenario. As shown in FIG. 1, a network device 1 and a network device 2 collaboratively serve a terminal device. The coordinated multi-point transmission scenario may be a non-coherent joint transmission (NCJT) scenario.

In FIG. 1, the network device 1 may be connected to the network device 2 through an X2 interface. Ideal information exchange cannot be implemented between the network device 1 and the network device 2 due to a delay of the X2 interface or a limited bandwidth. In this case, the network device 1 and the network device 2 may independently schedule data, to be specific, independently send downlink control information to a terminal device, indicate, by using the downlink control information, a physical downlink control channel scheduled by the terminal device, and independently send the scheduled data through a physical downlink shared channel. The terminal device may receive two physical downlink shared channels from a same component carrier (CC), separately perform demodulation and decoding, and then perform independent acknowledgement (ACK)/negative acknowledgement (NACK) feedback for each physical downlink shared channel. The network device 1 and the network device 2 may schedule retransmitted data based on an ACK/NACK result fed back by the terminal device. The component carrier may be a serving cell, a segment of continuous frequency domain resources in a transmission bandwidth of a cell, a segment of discontinuous frequency domain resources in a transmission bandwidth of a cell, or the like. This application is not limited thereto.

In a possible implementation, when the component carrier is understood as a segment of continuous or discontinuous frequency domain resources in a transmission bandwidth of a cell, the component carrier may be understood as a bandwidth part (BWP). In this case, the same component carrier may be understood as a same BWP, or different BWPs in which frequency domain resources overlapped. This is not limited in this application.

The downlink control information may be DCI in an LTE system, or may be downlink control information in a future communications system. The physical downlink control channel may be a PDCCH, or may be an enhanced physical downlink control channel (ePDCCH), or may be a physical downlink control channel in a future communications system. The physical downlink shared channel may be a PDSCH, or may be an enhanced physical downlink shared channel (ePDSCH), or may be a physical downlink shared channel in a future communications system.

In FIG. 1, the network device sends a downlink scheduling instruction and downlink data to the terminal device; and the terminal device receives the downlink scheduling instruction sent by the network device, receives the downlink data scheduled by the network device, determines whether the data has been correctly received, and performs ACK/NACK feedback. It should be noted that the terminal device may alternatively send uplink data to the network device; and the network device receives the uplink data, determines whether the data is correct, and indicates whether the data has been correctly received.

The embodiments of this application may be applicable to a downlink transmission scenario, or may be applicable to an uplink transmission scenario. In this embodiment of this application, downlink transmission is used as an example for description. Uplink transmission is similar to the downlink transmission. A difference is that the downlink transmission corresponds to a case in which the network device transmits data on a downlink shared channel, and the uplink transmission corresponds to a case in which the terminal device transmits data on an uplink shared channel.

The following describes content related to an HARQ.

An HARQ protocol is a function at a MAC layer, and the HARQ protocol exists at both a transmit end and a receive end. HARQ operations of the transmit end include transmitting and retransmitting a transport block, where the transport block may be abbreviated as TB, and receiving and processing an ACK/NACK. HARQ operations of the receive end include receiving a TB, performing soft combining processing, and generating an ACK/NACK.

A stop-and-wait protocol may be used in an HARQ to send data. In the stop-and-wait protocol, after sending a transport block, the transmit end stops and waits for acknowledgment information, and requires only one bit of information to indicate an ACK/NACK for the transport block. However, the transmit end stops and waits for an acknowledgment after each time of transmission. Consequently, a throughput is relatively low. Therefore, a plurality of parallel stop-and-wait protocols are used. Specifically, when waiting for the acknowledgment information in one HARQ process, the transmit end may use another HARQ process to send data.

These HARQ processes of the transmit end jointly form an HARQ entity. This HARQ entity combines the stop-and-wait protocols and allows continuous data transmission. Each HARQ process processes only one transport block each time. Each HARQ process requires an independent HARQ buffer at the receive end to perform soft combination on received data. Each receive end has an HARQ entity.

In carrier aggregation, all CCs have respective HARQ entities.

In space division multiplexing, two transport blocks are transmitted in parallel in one transmission time interval (TTI). In this case, each transport block has independent HARQ acknowledgment information, and one HARQ entity includes two HARQ processes.

After receiving acknowledgment information (ACK/NACK), the transmit end needs to know an HARQ process corresponding to the acknowledgment information. This is determined by using a fixed timing relationship between the acknowledgment information and transmitted data.

HARQ protocols are classified into a synchronous type of HARQ protocols and an asynchronous type of HARQ protocols in time domain, and are classified into an adaptive type of HARQ protocols and a non-adaptive type of HARQ protocols in frequency domain. The classifications in time domain and frequency domain are specific for a same HARQ process. In LTE, one HARQ process can process only one transport block in one TTI.

The asynchronous HARQ means that retransmission may be performed at any moment, and also means that HARQ processes may be used in any order. The synchronous HARQ means that retransmission may be performed only at a fixed moment after transmission, and also means that only a particular HARQ process can be used in a particular TTI. An advantage of the synchronous HARQ is that no HARQ process number needs to be sent explicitly. An advantage of the asynchronous HARQ is that retransmission scheduling is more flexible.

The adaptive HARQ means that a physical resource block (PRB) and a modulation and coding scheme (MCS) that are used in retransmission may be changed. The non-adaptive HARQ means that a PRB resource and an MCS that are the same as those used in previous transmission (new transmission or previous retransmission) need to be used in retransmission.

Data sent by the network device is sequentially processed at a packet data convergence protocol (PDCP) layer, a radio link control (RLC) layer, a medium access control (MAC) layer, and a physical layer, and is finally transmitted to the terminal device. On the contrary, the terminal device sequentially performs processing at the physical layer, the MAC layer, the RLC layer, and the PDCP layer, and finally obtains data. Correspondingly, a MAC entity, an RLC entity, and a PDCP entity exist on a terminal device side. In this embodiment of this application, the PDCP layer and the PDCP entity are not distinguished, the RLC layer and the RLC entity are not distinguished, and the MAC layer and the MAC entity are not distinguished.

The PDCP layer processes a radio resource management message on a control plane (CP) and an internet protocol (IP) packet on a user plane (UP). Main functions of the PDCP layer include header compression, integrity protection and ciphering, and support for reordering and retransmission during handover. Each radio bearer has a PDCP entity.

Main functions of the RLC layer are segmentation and reassembly of upper-layer data packets, so that sizes of the upper-layer data packets are adapted to transmission at a physical layer. For a radio bearer requiring error-free transmission, the RLC layer may further restore a lost packet through retransmission. In addition, the RLC layer compensates, through resorting, for out-of-order reception caused by a bottom-layer HARQ operation. Each radio bearer has an RLC entity.

Main functions of the MAC layer are to multiplex data of different radio bearers, connect to a physical layer under the MAC layer through a transmission channel, and connect to an RLC layer above the MAC layer through a logical channel. Therefore, the MAC layer may perform multiplexing and demultiplexing between the logical channel and the transmission channel. A MAC layer on a sending side constructs a MAC protocol data unit (PDU), also referred to as a transport block, from a MAC service data unit (SDU) received through the logical channel. A MAC layer on a receiving side restores a MAC SDU from a MAC PDU received through the logical channel. The MAC layer further includes an HARQ entity, configured to perform sending and receiving HARQ operations. The sending HARQ operation includes sending and retransmitting a transport block, and receiving and processing ACK/NACK signaling. The receiving HARQ operation includes receiving a transport block, combining received data, and generating ACK/NACK signaling. There is a correspondence between a MAC entity and an HARQ entity. In a non-carrier aggregation scenario, there is generally a one-to-one correspondence, that is, one MAC entity corresponds to one HARQ entity. In a carrier aggregation scenario, one MAC entity may include a plurality of HARQ entities, and each HARQ entity corresponds to one component carrier.

Currently, how to determine an HARQ entity and/or process for a case in which the terminal device schedules, by using more than one piece of physical downlink control information, a plurality of data flows transmitted on a same carrier are still not determined.

That at least two network devices independently perform data scheduling and data transmission on a same carrier for one terminal device may belong to an intra-frequency multi-connectivity technology, an intra-frequency carrier aggregation technology, or a new protocol stack function division technology introduced in new radio (NR). For a same carrier, different network devices correspond to different connections, to be specific, different data radio bearers (DRB) are established for the terminal device, or physical downlink shared channels from different network devices are offloaded by a medium access control (MAC) layer, a radio link control (RLC) layer, a packet data convergence protocol (PDCP) layer, or a higher layer. At a physical layer, because there is no explicit indication field in a physical downlink control channel to indicate a network device from which a current physical downlink shared channel comes, the terminal device cannot distinguish between TBs from different network devices, and further, cannot transfer a data packet corresponding to a transport block to a correct HARQ entity at a MAC layer, a correct MAC entity, or a correct RLC entity.

Figure 2:
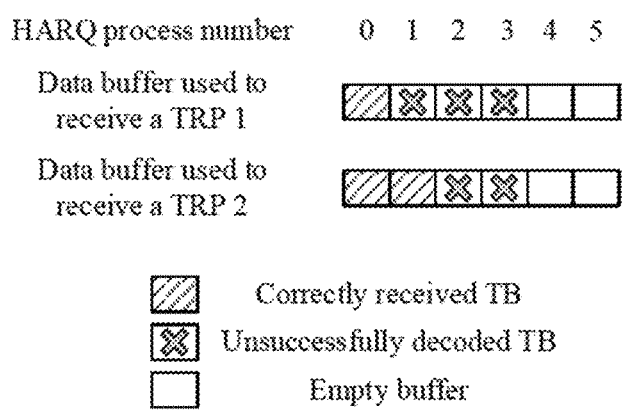
FIG. 2 is an example diagram showing that a terminal device buffers data sent by two network devices.

For example, a set of HARQ process numbers of a lost TB received by the terminal device from a TRP 1 is S1 (HARQ processes 1, 2, and 3 in FIG. 2), a set of received HARQ process numbers of a lost TB from a TRP 2 is S2 (HARQ processes 2 and 3 in FIG. 2), and an intersection set S0 (HARQ processes 2 and 3 in FIG. 2) exists between the S1 and the S2. In this case, in a next TTI, the TRP 1 and the TRP 2 simultaneously schedule TB retransmission corresponding to a HARQ process in S0. It is assumed that TB retransmission corresponding to the HARQ process 2 in FIG. 2 is scheduled, when receiving a TB retransmitted by the TRP 1 and a TB retransmitted by the TRP 2, the terminal device cannot distinguish the TB retransmitted by the TRP 1 from the TB retransmitted by the TRP 2. Therefore, the terminal device cannot combine and decode the retransmitted TBs and a corresponding initially transmitted TB, and HARQ performance cannot be ensured.

In view of this, the embodiments of this application provide a communication method and an apparatus therefor. A terminal device may determine an HARQ entity, a MAC entity, or an RLC entity corresponding to received data, thereby ensuring HARQ performance.

For downlink transmission, the embodiments of this application may be applied to a scenario in which at least two network devices perform data scheduling and data transmission on a same carrier for one terminal device, in other words, a scenario in which the terminal device receives, based on a downlink control information instruction carried on more than one physical downlink control channel, a plurality of data flows transmitted on a same carrier.

For uplink transmission, the embodiments of this application may be applied to a scenario in which at least two network devices perform data scheduling and data transmission on a same carrier for one terminal device, in other words, a scenario in which the terminal device sends, based on a downlink control information instruction carried on more than one physical downlink control channel, a plurality of data flows transmitted on a same carrier.

A first HARQ entity, a first MAC entity, a first RLC entity, a second HARQ entity, a second MAC entity, a second RLC entity, even a third HARQ entity, a third MAC entity, a third RLC entity, and the like in the embodiments of this application are used to describe a data receiving entity or a data processing entity for a receive end of data transmission, and are used to describe, for a transmit end of data transmission, an entity from which sent data comes.

A first network device and a second network device in the embodiments of this application may be different network devices. The different network devices may include a same baseband unit and different radio frequency units (or antenna panels), or may include different baseband units and different radio frequency units (or antenna panels), or may include different baseband units and a same radio frequency unit (or antenna panel). The first network device and the second network device may correspond to one cell, or may correspond to different cells. This is not limited in this application. The cell is a logical entity that independently sends a synchronization signal and that has a radio resource management function.

Figure 3:
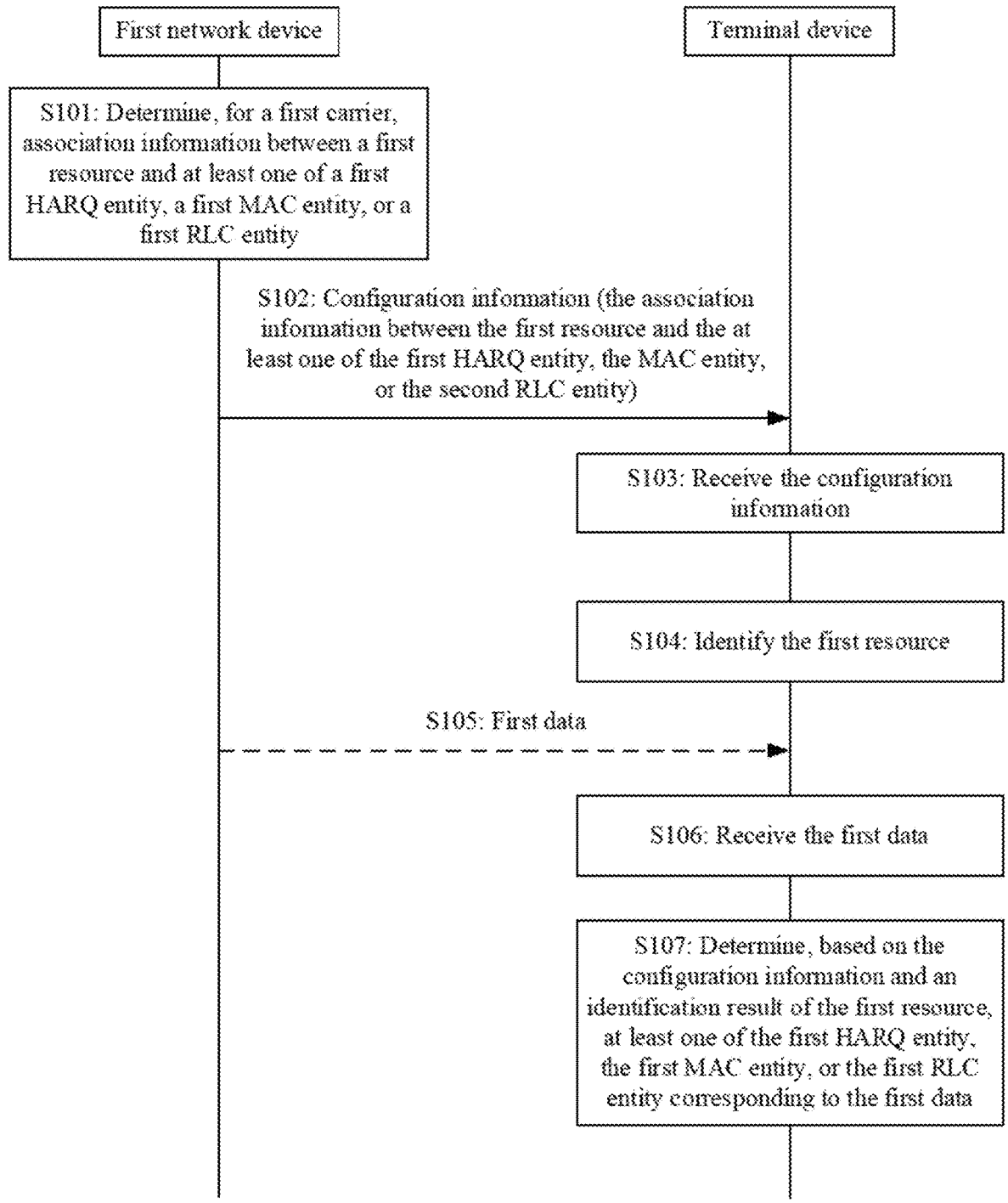
FIG. 3 is a schematic communication diagram of a communication method according to an embodiment of this application.
Figure 3A:
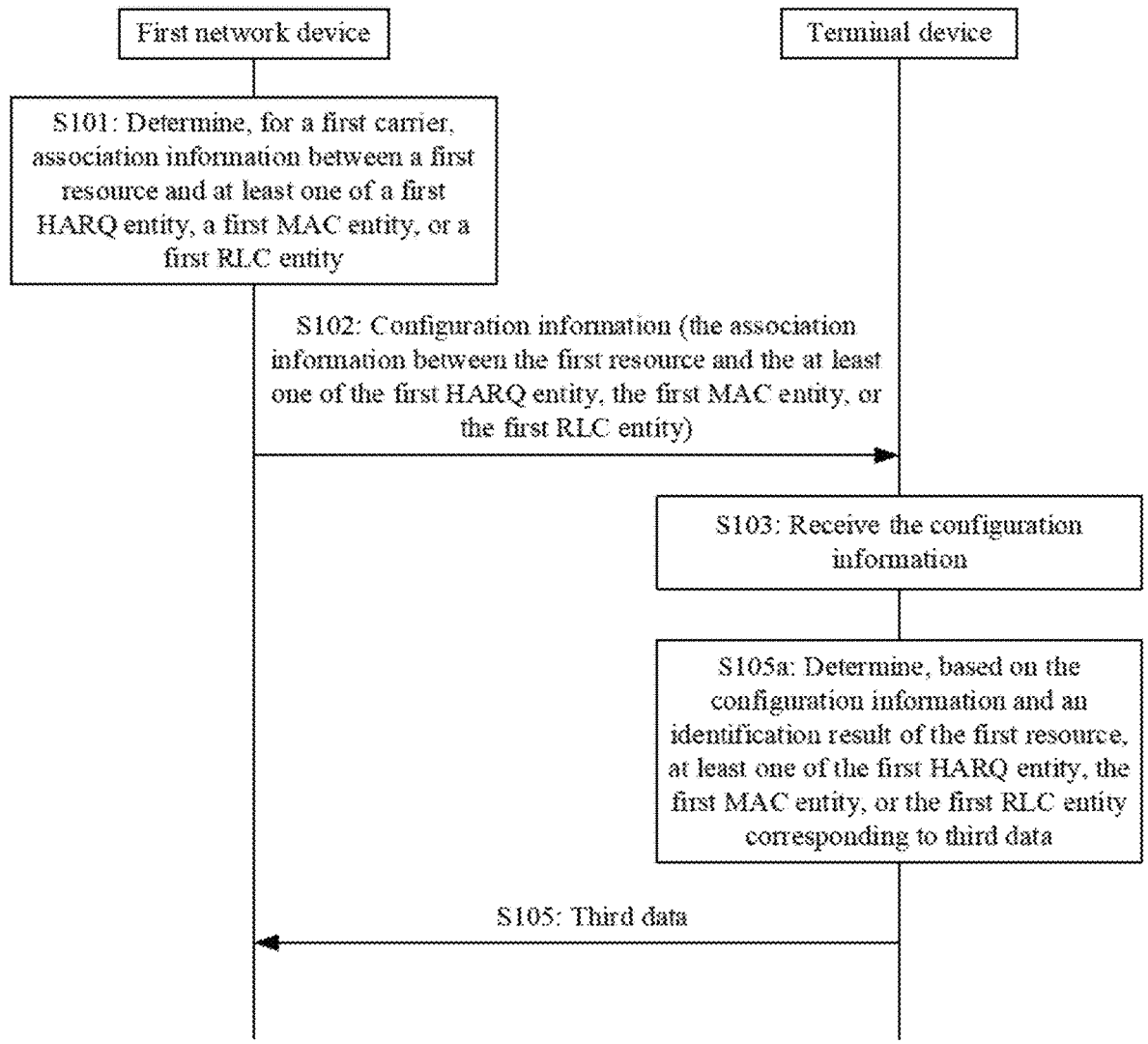
FIG. 3a is a schematic communication diagram of a communication method according to an embodiment of this application.

FIG. 3 is a schematic communication diagram of a communication method according to an embodiment of this application. The method is described from a perspective of interaction between a first network device and a terminal device. The method includes but is not limited to the following steps.

Step S101. The first network device determines, for a first carrier, association information between a first resource and at least one of a first HARQ entity, a first MAC entity, or a first RLC entity.

The first network device is one of a plurality of network devices serving the terminal device. In the embodiment shown in FIG. 3, it is assumed that the first network device performs configuration for the terminal device. Not only information related to a first network device side may be configured, but also information related to another network device side serving the terminal device may be configured. For example, information related to a second network device side may be configured.

The first carrier is one of at least one component carrier configured by a user, and the component carrier and the first carrier are not distinguished in this embodiment of this application.

Assuming that two network devices perform data scheduling and data transmission on a same carrier for the terminal device, the first network device may configure, for the terminal device and the first carrier, a parameter corresponding to at least one of the first HARQ entity, the first MAC entity, or the first RLC entity; and may further configure, for the terminal device and the first carrier, a parameter corresponding to at least one of a second HARQ entity, a second MAC entity, or a second RLC entity. In this embodiment of this application, it is assumed that the first HARQ entity, the first MAC entity, or the first RLC entity is used by the terminal device to process data sent by the first network device or process data sent to the first network device, and the second HARQ entity, the second MAC entity, or the second RLC entity is used by the terminal device to process data sent by a second network device. The processing may be sorting, reassembly, retransmission management, mapping of a physical channel to a logical channel, or the like of data packets.

The first network device may configure the association information between the first resource and the at least one of the first HARQ entity, the first MAC entity, or the first RLC entity, and may further configure association information between a second resource and at least one of the second HARQ entity, the second MAC entity, or the second RLC entity. If a third network device exists, the first network device may further configure or establish association information between a third resource and at least one of a third HARQ entity, a third MAC entity, or a third RLC entity. The rest may be deduced by analogy. It should be noted that the first resource is different from the second resource. If the third resource exists, the first resource, the second resource, and the third resource are different. The first resource, the second resource, and the third resource may be resources of a same type.

The first resource may include at least one of a first group of HARQ processes, a first HARQ process, a first antenna port, a first transport block, a first connection identifier, a first control channel resource, or a first control channel scrambling resource. The second resource may include at least one of a second group of HARQ processes, a second HARQ process, a second antenna port, a second transport block, a second connection identifier, a second control channel resource, or a second control channel scrambling resource.

In a possible implementation, the first resource includes the first group of HARQ processes, and the second resource includes the second group of HARQ processes. It may be understood that the first group of HARQ processes and the second group of HARQ processes include a plurality of HARQ processes. For example, the first group of HARQ processes includes an HARQ process 1 and an HARQ process 2. The association information between the first resource and the at least one of the first HARQ entity, the first MAC entity, or the first RLC entity may include a group identifier of the first group of HARQ processes corresponding to the at least one of the first HARQ entity, the first MAC entity, or the first RLC entity. The association information between the second resource and the at least one of the second HARQ entity, the second MAC entity, or the second RLC entity may include a group identifier of the second group of HARQ processes corresponding to the at least one of the second HARQ entity, the second MAC entity, or the second RLC entity.

For downlink data transmission, the first network device may assign, for the first carrier, the first group of HARQ processes to the terminal device, and may further assign, for the first carrier, the second group of HARQ processes to the terminal device. The first group of HARQ processes and the second group of HARQ processes are used by different network devices to transmit data. For example, the first group of HARQ processes is used by the first network device to transmit data, and the second group of HARQ processes is used by the second network device to transmit data; or the first group of HARQ processes is used by the second network device to transmit data, and the second group of HARQ processes is used by the first network device to transmit data. In this embodiment of this application, it is assumed that the first group of HARQ processes is used by the first network device to transmit data, and the second group of HARQ processes is used by the second network device to transmit data.

For uplink data transmission, the first network device may assign, for the first carrier, the first group of HARQ processes to the terminal device, and may further assign, for the first carrier the second group of HARQ processes to the terminal device. The first group of HARQ processes and the second group of HARQ processes are used to transmit data to different network devices. For example, the first group of HARQ processes is used to transmit data to the first network device, and the second group of HARQ processes is used to transmit data to the second network device; or the first group of HARQ processes is used to transmit data to the second network device, and the second group of HARQ processes is used to transmit data to the first network device. In this embodiment of this application, it is assumed that the first group of HARQ processes is used to transmit data to the first network device, and the second group of HARQ processes is used to transmit data to the second network device.

Process numbers of the first group of HARQ processes may be completely the same as process numbers of the second group of HARQ processes, but the group identifier of the first group of HARQ processes is different from the group identifier of the second group of HARQ processes. For example, the process numbers of the first group of HARQ processes are 1 to 8, and the group identifier of the first group of HARQ processes is 1; and the process numbers of the second group of HARQ processes are also 1 to 8, and the group identifier of the second group of HARQ processes is 2. Alternatively, process numbers of the first group of HARQ processes may be completely different from process numbers of the second group of HARQ processes. For example, the process numbers of the first group of HARQ processes are 1 and 2, and the process numbers of the second group of HARQ processes are 5 and 6. For another example, all process numbers are 1 to 8, the process numbers of the first group of HARQ processes are 1 to 4, and the process numbers of the second group of HARQ processes are 5 to 8. It may be understood that process numbers of HARQ processes of a transmit end are in a one-to-one correspondence with process numbers of HARQ processes of a receive end. In other words, the receive end has a same quantity of HARQ processes as the transmit end does, and the transmit end and the receive end have a same understanding of the HARQ process number.

Optionally, the first resource includes the first HARQ process, and the second resource includes the second HARQ process. It may be understood that the first HARQ process and the second HARQ process each include at least one HARQ process. The association information between the first resource and the at least one of the first HARQ entity, the first MAC entity, or the first RLC entity may include a process identification of the first HARQ process corresponding to the at least one of the first HARQ entity, the first MAC entity, or the first RLC entity. The association information between the second resource and the at least one of the second HARQ entity, the second MAC entity, or the second RLC entity may include a process identification of the second HARQ process corresponding to the at least one of the second HARQ entity, the second MAC entity, or the second RLC entity.

The first network device may assign, for the first carrier, the first HARQ process to the terminal device, and may further assign, for the first carrier, the second HARQ process to the terminal device. For downlink data transmission, the first HARQ process and the second HARQ process are used by different network devices to transmit data. For uplink data transmission, the first HARQ process and the second HARQ process are used to transmit data to different network devices, and the process identification of the first HARQ process is different from the process identification of the second HARQ process.

In a possible implementation, the first resource includes the first antenna port, and the second resource includes the second antenna port. It may be understood that the first antenna port and the second antenna port may be one or more antenna ports. For example, the first antenna port is an antenna port 9 and an antenna port 10. It should be noted that the first antenna port is different from the second antenna port, in other words, different network devices correspond to different antenna ports. The association information between the first resource and the at least one of the first HARQ entity, the first MAC entity, or the first RLC entity includes the first antenna port corresponding to the at least one of the first HARQ entity, the first MAC entity, or the first RLC entity. The association information between the second resource and the at least one of the second HARQ entity, the second MAC entity, or the second RLC entity includes the second antenna port corresponding to the at least one of the second HARQ entity, the second MAC entity, or the second RLC entity.

For an antenna port, a channel corresponding to a symbol sent through the antenna port may be deduced based on a channel of another symbol sent through the antenna port. Data and a reference signal (RS) may be sent through the antenna port. A channel corresponding to the data may be obtained by performing channel estimation by a pilot sent through the corresponding antenna port. The network device sends antenna port resource configuration information to the terminal device. The antenna port resource configuration information is used to indicate information about an antenna port group allowed by a data channel. The antenna port group includes at least one antenna port. The data channel may be a physical downlink shared channel (PDSCH) or a physical uplink shared channel (PUSCH). Optionally, the antenna port resource configuration information may further include quasi-co-location (quasi-co-location, QCL) parameter configuration information corresponding to the antenna port group. The QCL parameter configuration information may be used by the terminal device to determine a QCL parameter set required when the terminal device receives or demodulates a channel. For example, the QCL parameter configuration information may be used to configure a plurality of groups of QCL parameters. A value in each group of QCL parameters may be a channel large-scale parameter value corresponding to at least one of a channel state information-reference signal (CSI-RS), a phase-noise reference signal (PN-RS), a synchronization channel, a parameter (such as an angle of arrival or receive beam information) representing a space-related characteristic of the terminal device, or the like. For example, the QCL parameter configuration information may be at least one of a corresponding CSI-RS resource (such as a resource identifier), a PN-RS resource (such as a resource identifier), a synchronization channel resource (such as a resource identifier), a parameter (such as an angle of arrival, receive beam information, or an angle extension power spectrum) resource (such as a resource identifier) representing a UE-side space-related characteristic, or the like.

Optionally, the antenna port resource configuration information may be sent by using a radio resource control (RC) message or a MAC control element (CE).

For downlink data transmission, the first network device sends data to the terminal device through a part or all of the first antenna port. Optionally, the first network device indicates, by using downlink control information, that data is sent through an antenna port in an antenna port group configured by the first network device. The first network device may configure an antenna port through which the first network device sends data, and may further configure an antenna port through which another network device sends data.

For uplink data transmission, the terminal device sends data to the first network device through a part or all of the first antenna port. Optionally, the first network device indicates, by using downlink control information, that data is sent through an antenna port in an antenna port group configured by the first network device. The first network device may configure an antenna port through which the terminal device sends data to the first network device, and may further configure an antenna port through which the terminal device sends data to another network device.

In a possible implementation, the first resource includes the first transport block, and the second resource includes the second transport block. The association information between the first resource and the at least one of the first HARQ entity, the first MAC entity, or the first RLC entity includes the first transport block corresponding to the at least one of the first HARQ entity, the first MAC entity, or the first RLC entity. The association information between the second resource and the at least one of the second HARQ entity, the second MAC entity, or the second RLC entity includes the second transport block corresponding to the at least one of the second HARQ entity, the second MAC entity, or the second RLC entity.

For downlink data transmission, the first network device may configure the first transport block used by the first network device to transmit data, and may further configure the second transport block used by the second network device to transmit data.

For uplink data transmission, the first network device may configure the first transport block sent to the first network device, and may further configure the second transport block sent to the second network device.

Usually, the network device may schedule one transport block or two transport blocks to transmit data. The transport block obtained after scrambling, cyclic redundancy check (cyclic redundancy check, CRC), and coding corresponds to a codeword at a physical layer, and one transport block may correspond to one codeword at the physical layer.

In a possible implementation, the first resource includes the first connection identifier, and the second resource includes the second connection identifier. The first connection identifier is different from the second connection identifier, in other words, different network devices correspond to different connection identifiers. The association information between the first resource and the at least one of the first HARQ entity, the first MAC entity, or the first RLC entity includes the first connection identifier corresponding to the at least one of the first HARQ entity, the first MAC entity, or the first RLC entity. The association information between the second resource and the at least one of the second HARQ entity, the second MAC entity, or the second RLC entity includes the second connection identifier corresponding to the at least one of the second HARQ entity, the second MAC entity, or the second RLC entity.

For downlink data transmission, the first network device may configure the first connection identifier used by the first network device to transmit data, and may further configure the second connection identifier used by the second network device to transmit data.

For uplink data transmission, the first network device may configure the first connection identifier used to send data to the first network device, and may further configure the second connection identifier used to send data to the second network device.

A connection identifier may be used to identify a connection between a network device and a terminal device, and the terminal device may determine the corresponding network device by using the connection identifier. The connection identifier may further be used to identify a network device or a cell connected to the terminal device, and the terminal device may determine the corresponding cell based on the connection identifier. It may be understood that the connection identifier corresponds to an entity, and the entity may be a network device or a cell, or may be an HARQ entity, a MAC entity, or an RLC entity.

In a possible implementation, the first resource includes the first control channel resource, and the second resource includes the second control channel resource. The association information between the first resource and the at least one of the first HARQ entity, the first MAC entity, or the first RLC entity includes the first control channel resource corresponding to the at least one of the first HARQ entity, the first MAC entity, or the first RLC entity. The association information between the second resource and the at least one of the second HARQ entity, the second MAC entity, or the second RLC entity includes the second control channel resource corresponding to the at least one of the second HARQ entity, the second MAC entity, or the second RLC entity.

The network device sends control channel resource configuration information to the terminal device. The control channel resource configuration information is used to configure a control channel resource, including at least one of a time domain resource (such as a control channel start symbol), a frequency domain resource (such as a physical resource block occupied by a control channel), a resource element group (resource element group, REG) bundle size (bundle size) (where in this group, resource elements (resource element, RE) use a same precode), an aggregation level (where the aggregation level is defined as a quantity of control channel elements (control channel element, CCE) forming the control channel) of search space, a physical control channel candidate, a transmission type (such as REG-to-CCE localized or distributed mapping), a frame structure parameter, or QCL information.

Optionally, the control channel resource configuration information is sent by using an RRC message.

The network device sends a control channel to the terminal device by using a control channel resource configured by a network side device. The control channel is used to schedule data, and indicate a time-frequency resource, an antenna port, and the like that are occupied by the data.

In a possible implementation, the first resource includes the first control channel scrambling resource, and the second resource includes the second control channel scrambling resource. The first control channel scrambling resource is different from the second control channel scrambling resource, in other words, different network devices correspond to different control channel scrambling resources. The association information between the first resource and the at least one of the first HARQ entity, the first MAC entity, or the first RLC entity includes the control channel scrambling resource corresponding to the at least one of the first HARQ entity, the first MAC entity, or the first RLC entity. The association information between the first resource and the at least one of the second HARQ entity, the second MAC entity, or the second RLC entity includes the control channel scrambling resource corresponding to the at least one of the second HARQ entity, the second MAC entity, or the second RLC entity.

The control channel scrambling resource is used to scramble a control channel, and may be a cell radio network temporary identifier (cell radio network temporary identifier, C-RNTI). The C-RNTI may be used to perform cyclic redundancy check (CRC) scrambling on a control channel or a data channel, and is used to perform CRC scrambling on the control channel in this embodiment of this application. The control channel scrambling resource may alternatively be another radio network temporary identifier, such as a semi-persistent scheduling cell radio network temporary identifier (SPS-CRNTI), a random access radio network temporary identifier (RA-RNTI), or a paging radio network temporary identifier (P-RNTI).

The control channel scrambling resource may be predefined, or may be configured by the network device. For the control channel scrambling resource configured by the network device, control channel scrambling resource configuration information is sent. The control channel scrambling resource configuration information may be sent by using an RRC message or a MAC CE message.

It should be noted that the foregoing several resources do not constitute a limitation on this embodiment of this application, and another resource that can be used to distinguish between network devices shall fall within the protection scope of this embodiment of this application.

Step S102: The first network device sends configuration information to the terminal device, where the configuration information includes the association information between the first resource and the at least one of the first HARQ entity, the first MAC entity, or the first RLC entity.

Optionally, the first network device sends the configuration information to the terminal device by using the RRC message, where the configuration information includes the association information between the first resource and the at least one of the first HARQ entity, the first MAC entity, or the first RLC entity. Alternatively, the first network device sends the configuration information to the terminal device by using other higher layer signaling.

The configuration information may further include the association information between the second resource and the at least one of the second HARQ entity, the second MAC entity, or the second RLC entity. If the third network device exists, the configuration information may further include the association information between the third resource and the at least one of the third HARQ entity, the third MAC entity, or the third RLC entity.

Optionally, the first network device sends, to the second network device, the association information, determined for the first carrier, between the second resource and the at least one of the second HARQ entity, the second MAC entity, or the second RLC entity, so that the second network device performs data scheduling and data transmission for the terminal device and the first carrier.

Step S103: The terminal device receives the configuration information. Optionally, the terminal device receives the configuration information from the first network device.

Optionally, the terminal device receives the configuration information from the first network device by using the RRC message or the higher layer signaling.

Step S104: The terminal device identifies the first resource.

The first resource includes the first group of HARQ processes. The terminal device receives a message carrying the group identifier of the first group of HARQ processes, and determines the first group of HARQ processes based on the group identifier of the first group of HARQ processes in the message. The group identifier is used to distinguish between different HARQ process groups. The message carrying the group identifier of the first group of HARQ processes may be DCI. For example, an HARQ group indication field in the DCI is used to indicate the group identifier.

Optionally, the first resource includes the first HARQ process, and the terminal device receives a message carrying the process identification of the first HARQ process, and determines the first HARQ process based on the process identification of the first HARQ process in the message. The process identification is used to distinguish between different HARQ processes. The message carrying the process identification of the first HARQ process may be DCI. For example, an HARQ process indication field in the DCI is used to indicate the process identification.

The first resource includes the first antenna port. The terminal device receives a message carrying indication information of the first antenna port, and determines the first antenna port based on the indication information of the first antenna port in the message. The indication information of the first antenna port is used to indicate the first antenna port. The message carrying the indication information of the first antenna port may be DCI.

The first resource includes the first transport block. The terminal device receives a message carrying indication information of the first transport block, and determines the first transport block based on the indication information of the first transport block in the message. The message carrying the indication information of the first transport block may be DCI. For example, a transport block indication field in the DCI indicates the transport block. If the first network device occupies only the first transport block indication field, that is, the first transport block is used to transmit data, the second transport block indication field in corresponding DCI may be a preset value. The preset value is used to identify that the transport block is disabled, in other words, the second transport block is not used to transmit data.

A new transmission indication and a retransmission indication of the network device correspond to a same transport block indication field, and are identified by using a new transmission data indicator bit. In this way, each network device may independently manage an HARQ process, and the terminal device may learn, by using an enabled transport block and an HARQ process in received DCI, of new transmission data information corresponding to current retransmitted data, and further, can perform normal combination and decoding of different redundancy versions.

The first resource includes the first connection identifier. The terminal device receives a message carrying indication information of the first connection identifier, and determines the first connection identifier based on the indication information of the first connection identifier in the message. The indication information of the first connection identifier is used to indicate the first connection identifier. The message carrying the indication information of the first connection identifier may be DCI.

The first resource includes the first control channel scrambling resource. When receiving the first control channel, the terminal device descrambles the first control channel by using a resource. If the first control channel is obtained through descrambling, it may be determined that the resource is the first control channel scrambling resource.

The first resource includes the first control channel resource. When receiving the first control channel, the terminal determines a resource occupied by the first control channel, for example, one or more of a time domain resource (such as a control channel start symbol), a frequency domain resource (such as a physical resource block occupied by a control channel), an aggregation level of search space, a physical control channel candidate, and the like, and determines the one or more of the time domain resource, the frequency domain resource, the aggregation level of the search space, the physical control channel candidate, and the like as the first control channel resource.

Step S105: The first network device sends first data.

Optionally, the first network device sends the first data by using at least one resource of the first HARQ process, the first group of HARQ processes, the first antenna port, the first transport block, or the first connection identifier. Optionally, the first network device sends the first data to the terminal device by using at least one resource of the first HARQ process, the first group of HARQ processes, the first antenna port, the first transport block, or the first connection identifier.

Optionally, the first network device sends the first control channel by using the first control channel resource and/or the first control channel scrambling resource, and the first control channel is used to schedule the first data, for example, is used to indicate a time-frequency resource and/or an antenna port and/or an HARQ process, or the like of the first data.

Step S106: The terminal device receives the first data.

Optionally, the terminal device receives the first data by using at least one resource of the first HARQ process, the first group of HARQ processes, the first antenna port, the first transport block, or the first connection identifier. Optionally, the terminal device receives the first data from the first network device by using at least one resource of the first HARQ process, the first group of HARQ processes, the first antenna port, the first transport block, or the first connection identifier.

Optionally, the first network device obtains the first data based on the first control channel.

Step S107: The terminal device determines, based on configuration information and an identification result of the first resource, at least one of the first HARQ entity, the first MAC entity or the first RLC entity corresponding to the first data.

In a possible implementation, the identification result of the first resource is at least one of the first HARQ process, the first group of HARQ processes, the first antenna port, the first transport block, or the first connection identifier, that is, the terminal device may learn of the at least one of the first HARQ process, the first group of HARQ processes, the first antenna port, the first transport block, or the first connection identifier based on indication information. In this case, the terminal may determine, based on association information between the foregoing various resources and at least one of the first HARQ entity, the first MAC entity, or the first RLC entity, the at least one of the first HARQ entity, the first MAC entity, or the first RLC entity corresponding to the first data.

In a possible implementation, the identification result the first resource is a descrambling resource of the first control channel and/or a resource occupied by the first control channel. In this case, the terminal device may determine, based on association information between the first control channel scrambling resource and/or the first control channel resource and at least one of the first HARQ entity, the first MAC entity, or the first RLC entity, the at least one of the first HARQ entity, the first MAC entity, or the first RLC entity corresponding to the first data.

It may be understood that the first network device configures association information between an entity and the foregoing various resources. If the terminal device leans of the association information and one of the foregoing various resources, the terminal device may obtain an entity corresponding to the first data sent by the first network device.

It may be understood that a sequence of the steps in the foregoing method may be adjusted based on specific implementation. The numbers of the foregoing steps do not limit the sequence of the corresponding steps. For example, a sequence of S105 or S106 and S104 may be exchanged.

In a possible implementation, the identification result the first resource is a descrambling resource of the first control channel and/or a resource occupied by the first control channel. In this case, the terminal device may determine, based on association information between the first control channel scrambling resource and/or the first control channel resource and at least one of the first HARQ entity, the first MAC entity, or the first RLC entity, the at least one of the first HARQ entity, the first MAC entity, or the first RLC entity corresponding to the first data.

It may be understood that the first network device configures association information between an entity and the first control channel scrambling resource and/or the first control channel resource. If the terminal device detects the first control channel, the terminal device may determine an entity corresponding to the first data scheduled by the first network device.

In the embodiment shown in FIG. 3, the first network device configures the association information between the first resource and the at least one of the first HARQ entity, the first MAC entity, or the first RLC entity, and sends the association information to the terminal device, so that the terminal device may determine the at least one of the first HARQ entity, the first MAC entity, or the first RLC entity corresponding to the first data, thereby ensuring HARQ performance.

In the embodiment shown in FIG. 3, in addition to association information for the first network device, the configuration information sent by the first network device may further include association information for the second network device. In this case, when receiving a plurality of data flows for a same carrier, the terminal device may determine, based on configuration information and a resource identification result, at least one of an HARQ entity, a MAC entity, or an RLC entity corresponding to the various data flows.

The downlink transmission procedure is shown in the embodiment shown in FIG. 3. In addition to step S101 to step S104 shown in FIG. 3, an embodiment of uplink transmission further includes the following steps.

Step S105a: The terminal device determines, based on the configuration information and the identification result of the first resource, at least one of the first HARQ entity, the first MAC entity, or the first RLC entity corresponding to third data.

In a possible implementation, the identification result of the first resource is at least one of the first HARQ process, the first group of HARQ processes, the first antenna port, the first transport block, or the first connection identifier, that is, the terminal device may learn of the at least one of the first HARQ process, the first group of HARQ processes, the first antenna port, the first transport block, or the first connection identifier based on indication information. In this case, the terminal may determine, based on association information between the foregoing various resources and at least one of the first HARQ entity, the first MAC entity, or the first RLC entity, the at least one of the first HARQ entity, the first MAC entity, or the first RLC entity corresponding to the third data.

In a possible implementation, the identification result of the first resource is a descrambling resource of the first control channel and/or a resource occupied by the first control channel. In this case, the terminal device may determine, based on association information between the first control channel scrambling resource and/or the first control channel resource and at least one of the first HARQ entity, the first MAC entity, or the first RLC entity, the at least one of the first HARQ entity, the first MAC entity, or the first RLC entity corresponding to the third data.

Step S106a: The terminal device sends the third data corresponding to the at least one of the first HARQ entity, the first MAC entity, or the first RLC entity.

Optionally, the terminal device sends the third data by using at least one resource of the first HARQ process, the first group of HARQ processes, the first antenna port, the first transport block, or the first connection identifier. Optionally, the terminal device sends the third data to the first network device by using at least one resource of the first HARQ process, the first group of HARQ processes, the first antenna port, the first transport block, or the first connection identifier.

The third data corresponding to the at least one of the first HARQ entity, the first MAC entity, or the first RLC entity is data from the first HARQ entity, the first MAC entity, or the first RLC entity.

According to the foregoing uplink transmission procedure, the network device may determine a terminal device sending uplink data, and further determine an entity corresponding to the uplink data.

In an optional embodiment, each network device independently configures association information, to be specific, the first network device configures the first association information between the first resource and the at least one of the first HARQ entity, the first MAC entity, or the first RLC entity, and the second network device configures the second association information between the second resource and the at least one of the second HARQ entity, the second MAC entity, or the second RLC entity. In this way, when receiving a plurality of data flows for a same carrier, the terminal device may determine, based on various configuration information and resource identification results corresponding to various network devices, at least one of an HARQ entity, a MAC entity, and an RLC entity corresponding to the data flows.

Optionally, the first network device sends the first association information to the second network device, and the second network device sends the second association information to the first network device, so that the network device may learn of resources configured by another network device for the terminal device.

Figure 4A:
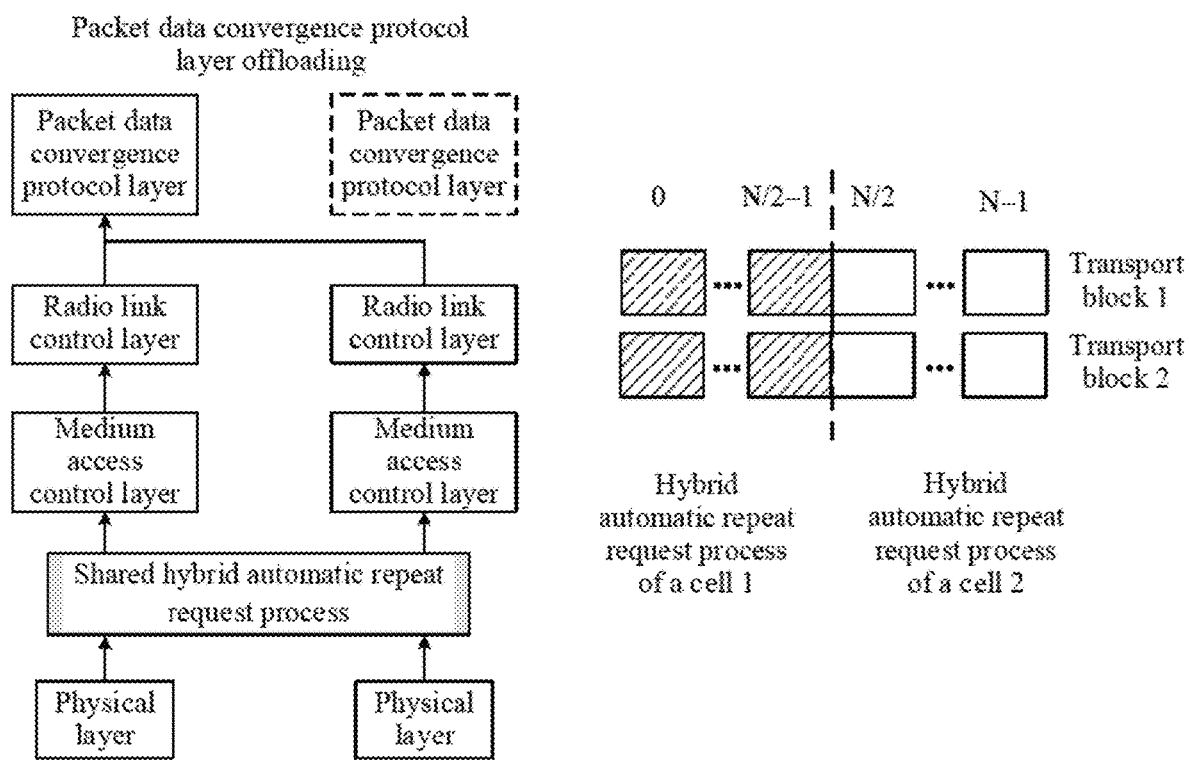
FIG. 4a is a first example diagram of a solution in which a first network device and a second network device share an HARQ process.
Figure 4B:
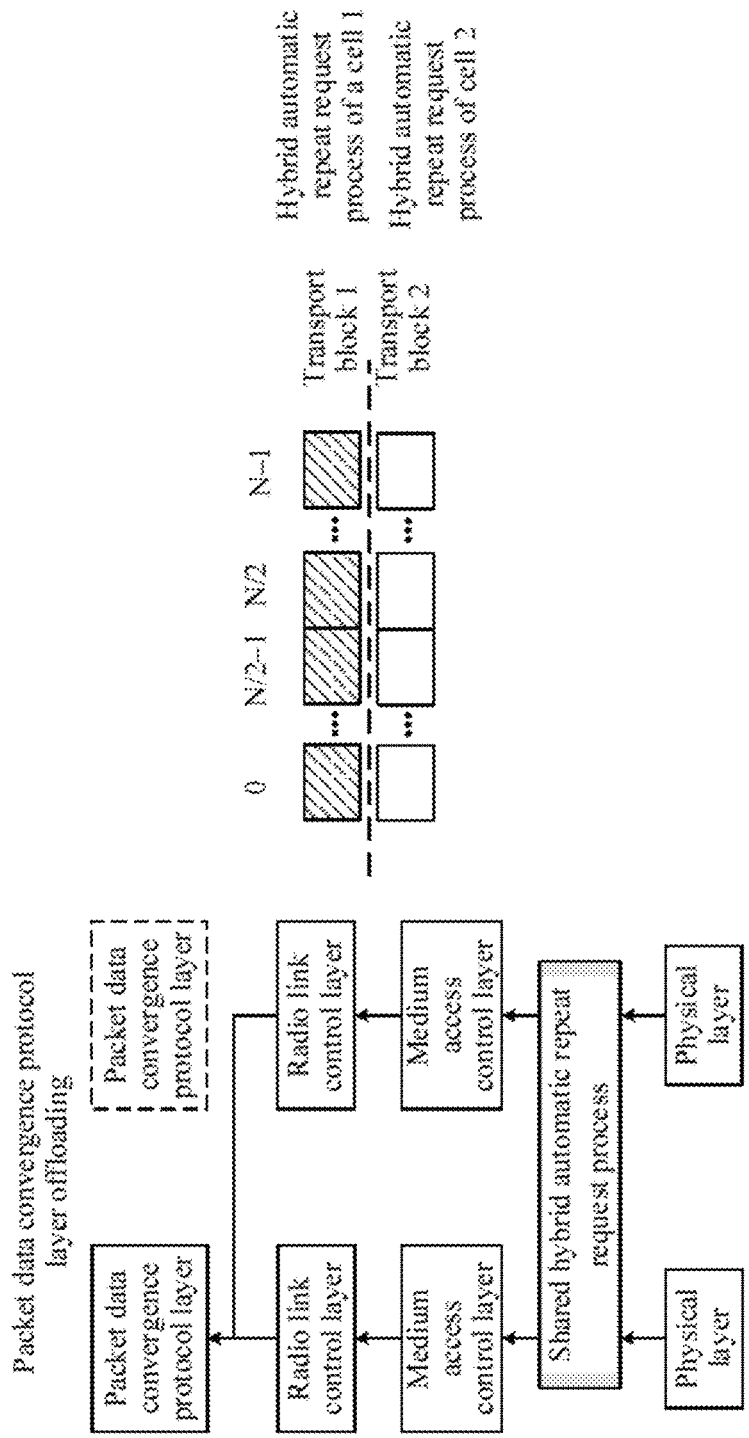
FIG. 4b is a second example diagram of a solution in which a first network device and a second network device share an HARQ process.

In an optional embodiment, FIG. 4a and FIG. 4b are example diagrams of solutions in which a first network device and a second network device share an HARQ process. In FIG. 4a and FIG. 4b, it is assumed that a cell corresponds to the first network device, and a cell 2 corresponds to the second network device. In FIG. 4a and FIG. 4b, 0 to N are HARQ process numbers, a TB 1 is the first transport block, a TB 2 is the second transport block, and a PHY is a physical layer. A difference between FIG. 4a and FIG. 4b is that in FIG. 4a, a network device transmits data by using the TB 1 and the TB 2; and in FIG. 4b, the first network device transmits data by using the TB 1, and the second network device transmits data by using the TB 2.

In FIG. 4a, the first network device corresponds to a first group of HARQ processes (0 to N/2−1), the second network device corresponds to a second group of HARQ processes (N/2~N−1), and both the first network device and the second network device transmit data by using the TB 1 and the TB 2.

Based on FIG. 4a, the first network device may determine association information, for a first carrier, between a first MAC entity and/or a first RLC entity and the first group of HARQ processes, and may further determine association information, for the first carrier, between a second MAC entity and/or a second RLC entity and the second group of HARQ processes.

Optionally, the first network device may determine association information, for a first carrier, between a first MAC entity and/or a first RLC entity and the first group of HARQ processes; and the second network device may determine association information between a second MAC entity and/or a second RLC entity and the second group of HARQ processes.

The first network device may send an interaction message to the second network device through an interface between network devices, to avoid occupying a same HARQ process. The interaction message indicates a group number of the first group of HARQ processes. For example, an indication may be given in a form of a bitmap (bitmap), or n groups may be evenly divided by default, and a grouping indication is given by using log 2(n) bits; or an indication may be given in another manner. Similarly, the second network device may also send an interaction message to the first network device through an X2 or Xn interface, where the interaction message indicates the group number of the first group of HARQ processes.

In FIG. 4b, HARQ processes corresponding to the first network device are 0 to N−1, and HARQ processes corresponding to the second network device are also 0 to N−1, but the first network device transmits data by using the TB 1, and the second network device transmits data by using the TB 2.

Based on FIG. 4b, the first network device may determine association information, for a first carrier, between a first MAC entity and/or a first RLC entity and a first transport block, and may further determine association information, for the first carrier, between a second MAC entity and/or a second RLC entity and a second transport block.

Optionally, the first network device may determine association information, for a first carrier, between a first MAC entity and/or a first RLC entity and a first transport block; and the second network device may determine association information between a second MAC entity and/or a second RLC entity and a second transport block.

The first network device may send an interaction message to the second network device through an interface between network devices, to avoid using a same TB. The interaction message indicates the TB 1. A specific manner used for indication is not limited herein, for example, a transport block indicating the TB 1. Similarly, the second network device may also send an interaction message to the first network device through an X2 or Xn interface, where the interaction message indicates the TB 2.

Figure 5A:
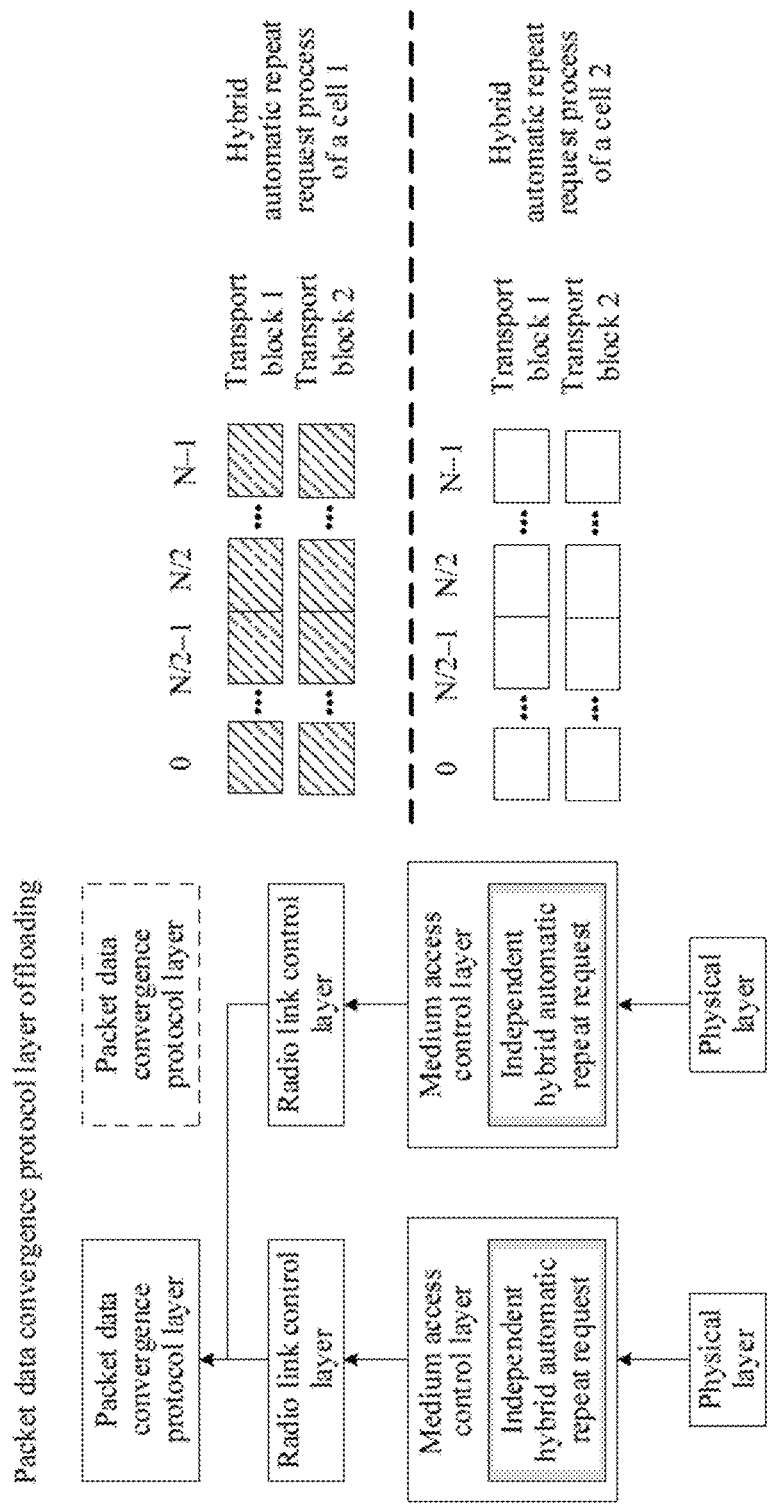
FIG. 5a is a first example diagram of a solution in which a first network device and a second network device share an independent HARQ.
Figure 5B:
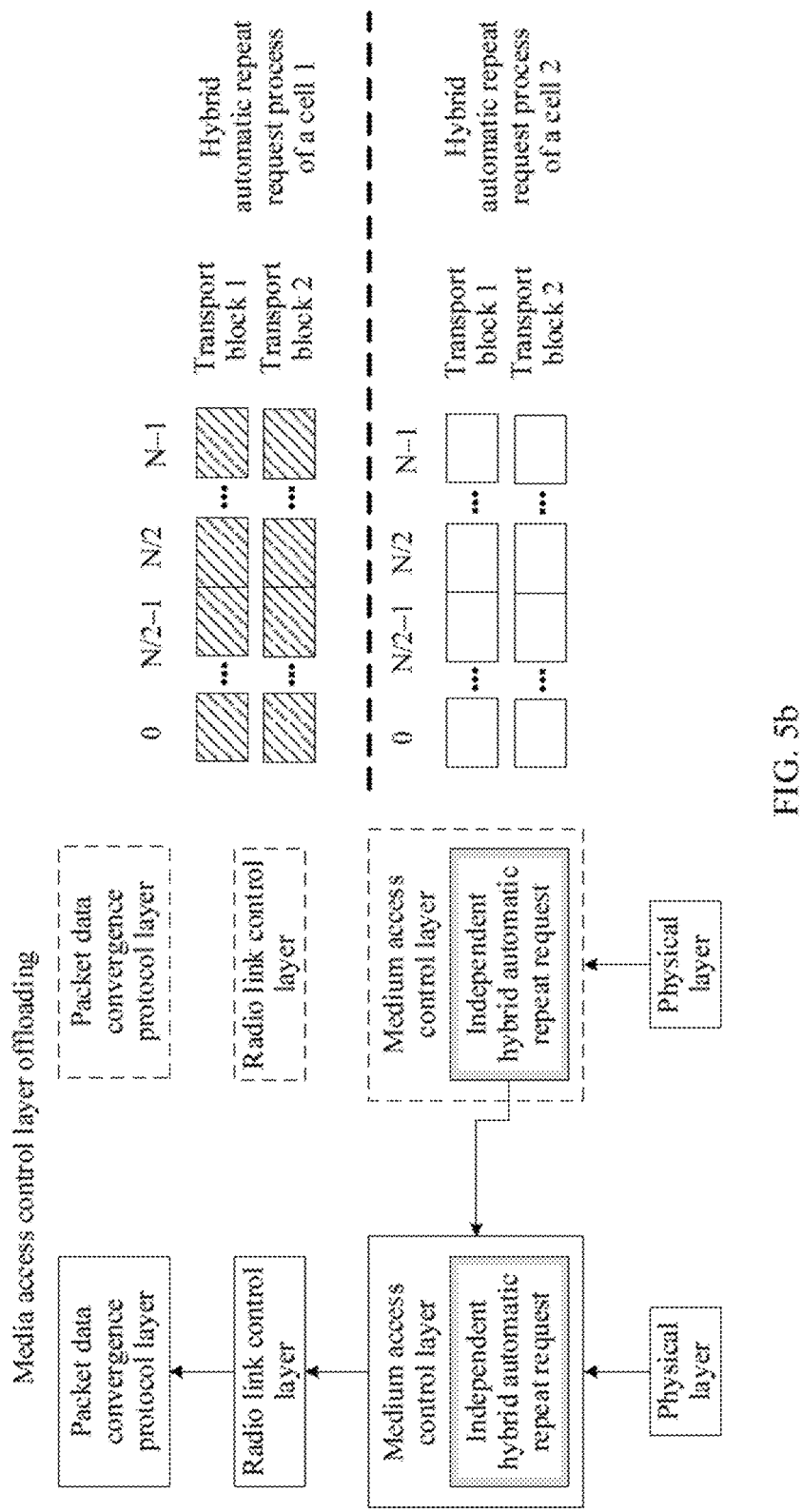
FIG. 5b is a second example diagram of a solution in which a first network device and a second network device share an independent HARQ.

In an optional embodiment, FIG. 5a and FIG. 5b are example diagrams of solutions in which a first network device and a second network device share independent HARQ processes. A difference between FIG. 5a and FIG. 5b is that FIG. 5a shows PDCP offloading, and FIG. 5b shows MAC offloading. In FIG. 5a and FIG. 5b, it is assumed that a cell 1 corresponds to the first network device, and a cell 2 corresponds to the second network device.

Based on FIG. 5a, the first network device may determine association information, for a first carrier, between at least one of a first HARQ entity, a first MAC entity, or a first RLC entity and a first control channel resource and/or a first control channel scrambling resource: and may further determine association information, for the first carrier, between at least one of a second HARQ entity, a second MAC entity, or a second RLC entity and a second control channel resource and/or a second control channel scrambling resource.

Optionally, the first network device may determine association information, for a first carrier, between at least one of a first HARQ entity, a first MAC entity, or a first RLC entity and a first control channel resource and/or a first control channel scrambling resource: and the second network device may determine association information, for the first carrier, between at least one of a second HARQ entity, a second MAC entity, or a second RLC entity and a second control channel resource and/or a second control channel scrambling resource.

Based on FIG. 5b, the first network device may determine association information, for a first carrier, between a first HARQ entity and a first control channel resource and/or a first control channel scrambling resource, and may further determine association information, for the first carrier, between a second HARQ entity and a second control channel resource and/or a second control channel scrambling resource.

Optionally, the first network device may determine association information, for a first carrier, between a first HARQ entity and a first control channel resource and/or a first control channel scrambling resource; and the second network device may determine association information, for first carrier, between a second HARQ entity and a second control channel resource and/or a second control channel scrambling resource.

Figure 6:
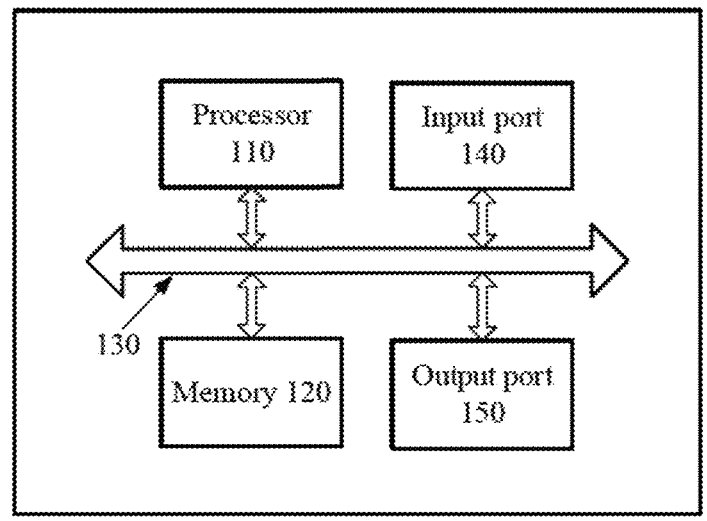
FIG. 6 is a first schematic diagram of a device according to an embodiment of this application.

According to the foregoing method. FIG. 6 is a first schematic diagram of a device according to an embodiment of this application. As shown in FIG. 6, the device may be a terminal device, or may be a chip or a circuit, for example, a chip or a circuit that may be disposed in a terminal device. The terminal device may correspond to the terminal device in the foregoing method.

The device may include a processor 110 and a memory 120. The memory 120 is configured to store a program or an instruction. The processor 110 is configured to execute the program or the instruction stored in the memory 120, to implement the actions performed by the terminal device in the corresponding method shown in FIG. 3, for example, to implement steps S104 and S107.

The device may further include an input port 140 and an output port 150. The device may further include a bus system 130. The processor 110, the memory 120, the input port 140, and the output port 150 may be connected by using the bus system 130.

Optionally, the processor 110 is configured to execute the program or the instruction stored in the memory 120, to control the input port 140 to receive a signal, and control the output port 150 to send a signal, so as to complete the steps performed by the terminal device in the foregoing method. The input port 140 and the output port 150 may be a same physical entity or different physical entities. When being the same physical entity, the input port 140 and the output port 150 may be collectively referred to as an input/output port.

The memory 120 may be integrated into the processor 110, or may be separated from the processor 110.

In an implementation, it may be considered that functions of the input port 140 and the output port 150 are implemented by using a transceiver circuit or a dedicated transceiver chip. The processor 110 may be implemented by using a dedicated processing chip, processing circuit, or a processor, or a universal chip.

In another implementation, it may be considered that the terminal device provided in this embodiment of this application is implemented by using a general-purpose computer. In other words, program code for implementing the functions of the processor 110 is stored in the memory, and a general-purpose processor executes the code in the memory to implement the functions of the processor 110, the input port 140, and the output port 150.

For concepts, explanations, detailed descriptions, and other steps related to the technical solutions provided in this embodiment of this application and related to the device, refer to related descriptions in the foregoing methods or another embodiment. Details are not described herein again.

Figure 7:
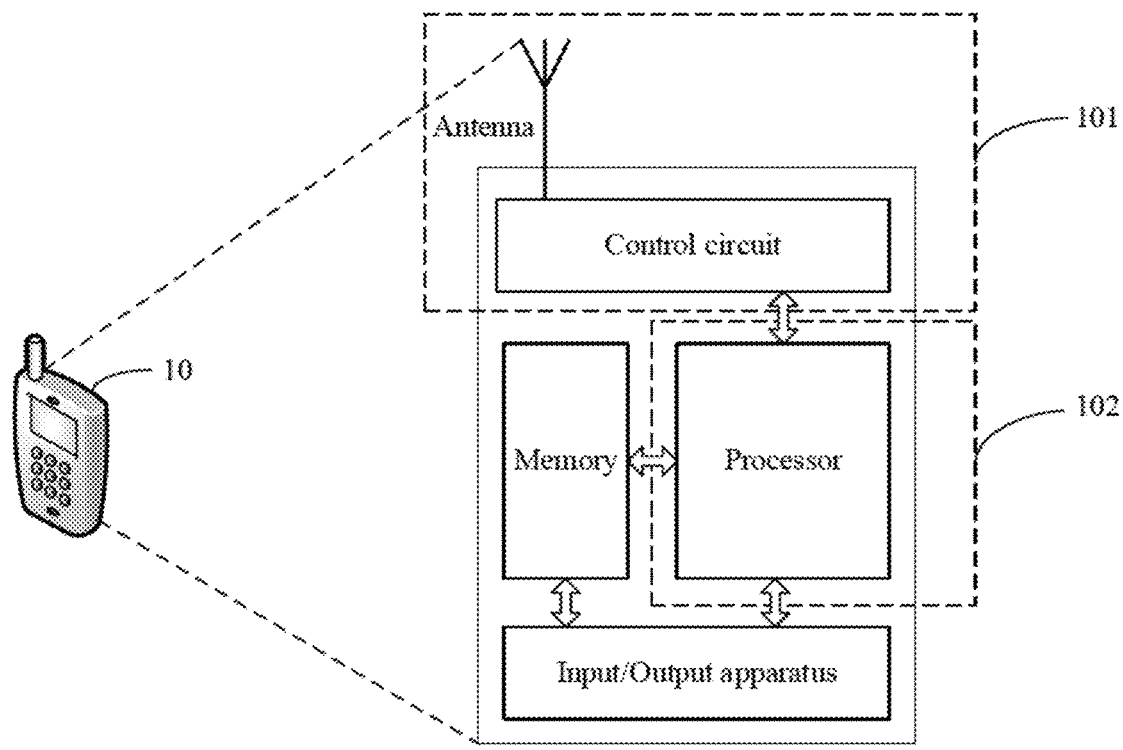
FIG. 7 is a schematic structural diagram of a terminal device according to this application.

FIG. 7 is a schematic structural diagram of a terminal device according to this application. The terminal device may be applicable to the system shown in FIG. 1. For ease of description, FIG. 7 shows only main components of the terminal device. As shown in FIG. 7, the terminal device includes a processor, a memory, a control circuit, an antenna, and an input/output apparatus. The processor is mainly configured to: process a communication protocol and communication data, control the entire terminal device, execute a software program, and process data of the software program, for example, is configured to support the terminal device in performing the actions described in the foregoing communication method embodiment. The memory is mainly configured to store the software program and the data. The control circuit is mainly configured to: perform conversion between a baseband signal and a radio frequency signal, and process a radio frequency signal. The control circuit and the antenna together may also be referred to as an input/output port, and the input/output port is mainly configured to send and receive a radio frequency signal in an electromagnetic wave form. The input/output apparatus such as a touchscreen, a display screen, or a keyboard is mainly configured to: receive data entered by a user, and output data to the user.

After the terminal device is powered on, the processor may read a software program in a storage unit, explain and execute an instruction of the software program, and process data of the software program. When data needs to be sent in a wireless manner, after performing baseband processing on the to-be-sent data, the processor outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that for ease of description, FIG. 7 shows only one memory and only one processor. Actually, the terminal device may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process a communication protocol and communication data. The central processing unit is mainly configured to: control the entire terminal device, execute a software program, and process data of the software program. The processor in FIG. 7 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal device may include a plurality of baseband processors to adapt to different network standards, the terminal device may include a plurality of central processing units to improve a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program. The processor executes the software program to implement a baseband processing function.

For example, in this embodiment of this application, the antenna and the control circuit that have receiving and sending functions may be considered as a transceiver unit 101 of the terminal device, and the processor having a processing function may be considered as a processing unit 102 of the terminal device. As shown in FIG. 7, the terminal device includes the transceiver unit 101 and the processing unit 102. The transceiver unit may alternatively be referred to as an input/output port, a transceiver, a transceiver apparatus, or the like. Optionally, a component configured to implement a receiving function in the transceiver unit 101 may be considered as a receiving unit, and a component configured to implement a sending function in the transceiver unit 101 may be considered as a sending unit. In other words, the transceiver unit 101 includes the receiving unit and the sending unit. For example, the receiving unit may also be referred to as a receiver, an input port, a receiver circuit, or the like, and the sending unit may be referred to as a transmitter, a transmitting device, a transmitter circuit, or the like.

Figure 8:
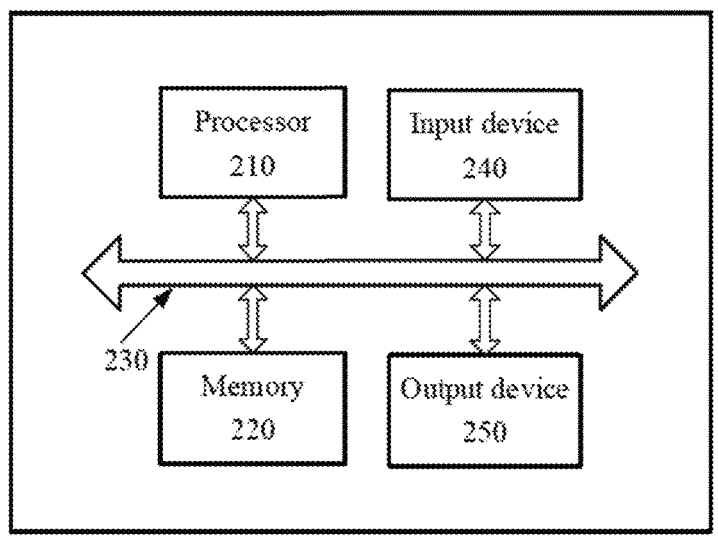
FIG. 8 is a second schematic diagram of a device according to an embodiment of this application.

According to the foregoing method, FIG. 8 is a second schematic diagram of a device according to an embodiment of this application. As shown in FIG. 8, the device may be a network device, or may be a chip or a circuit, for example, a chip or a circuit that may be disposed in a network device. The network device corresponds to the network device in the foregoing method. The device may include a processor 210 and a memory 220. The memory 220 is configured to store an instruction. The processor 210 is configured to execute a program or the instruction stored in the memory 220, so that the device implements the steps in the corresponding method shown in FIG. 3, for example, to implement step S101 and/or step S102.

The network device may further include an input port 240 and an output port 250. Still further, the network device may further include a bus system 230.

The processor 210, the memory 220, the input port 240, and the output port 250 are connected to each other by using the bus system 230. The processor 210 is configured to execute the instruction stored in the memory 220, so as to control the input port 240 to receive a signal, and control the output port 250 to send a signal, so that the steps performed by the network device in the foregoing method are completed. The input port 240 and the output port 250 may be a same physical entity or different physical entities. When being the same physical entity, the input port 140 and the output port 150 may be collectively referred to as an input/output port. The memory 220 may be integrated into the processor 210, or may be separated from the processor 210.

In an implementation, it may be considered that functions of the input port 240 and the output port 250 are implemented by using a transceiver circuit or a dedicated transceiver chip. The processor 210 may be implemented by using a dedicated processing chip, processing circuit, or processor, or a universal chip.

In another implementation, it may be considered that the network device provided in this embodiment of this application is implemented by using a general-purpose computer. In other words, program code for implementing the functions of the processor 210 is stored in the memory, and a general-purpose processor executes the code in the memory to implement the functions of the processor 210, the input port 240, and the output port 250.

For concepts, explanations, detailed descriptions, and other steps related to the technical solutions provided in this embodiment of this application and related to the device, refer to related descriptions in the foregoing methods or another embodiment. Details are not described herein again.

Figure 9:
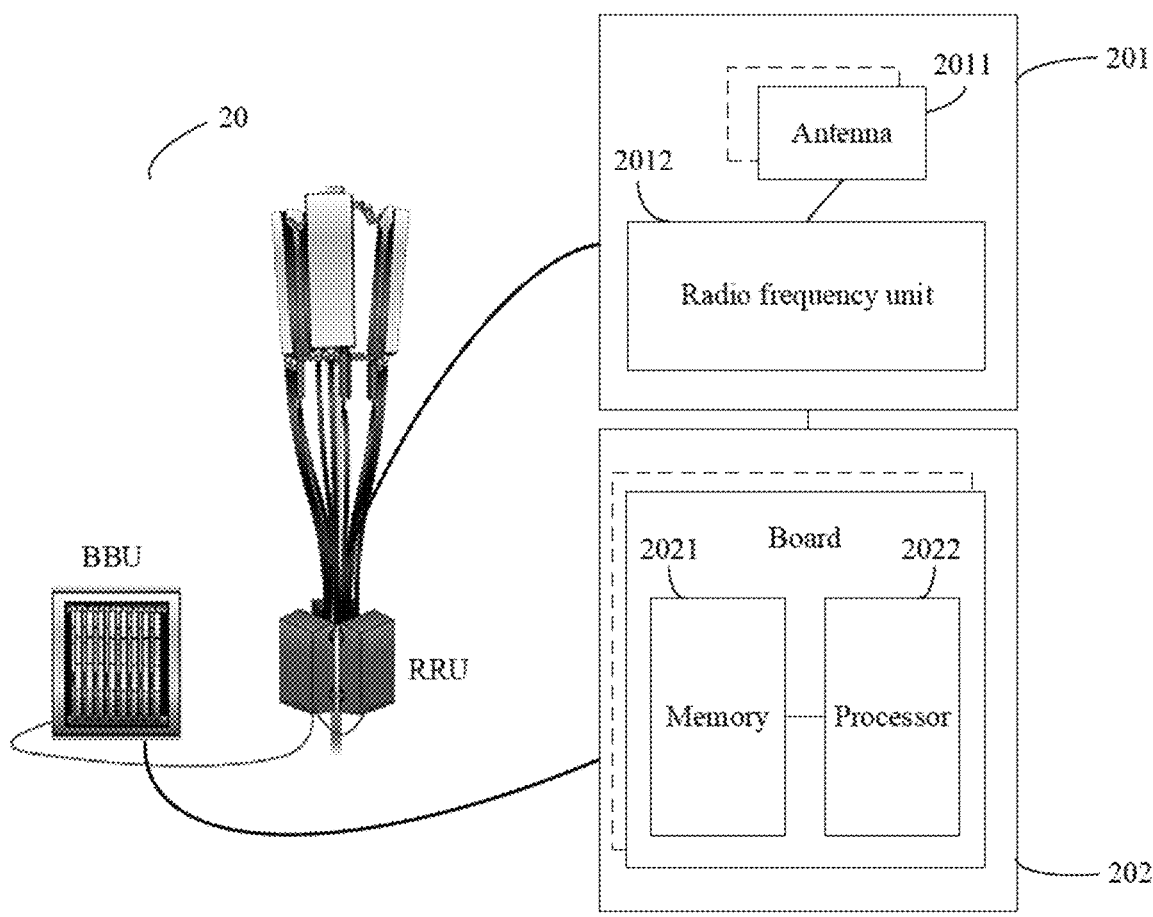
FIG. 9 is a schematic structural diagram of a network device according to an embodiment of this application.

According to the foregoing method, FIG. 9 is a schematic structural diagram of a network device according to an embodiment of this application, for example, may be a schematic structural diagram of a base station. As shown in FIG. 9, the base station may be applied to the system shown in FIG. 1. The base station includes one or more radio frequency units, such as a remote radio unit (RRU) 201 and one or more baseband units (BBU) (also referred to as digital units, DUs) 202. The RRU 201 may be referred to as a transceiver unit, a transceiver, a transceiver circuit, an input/output port, or the like, and may include at least one antenna 2011 and a radio frequency unit 2012. The RRU 201 is mainly configured to: send and receive radio frequency signals and perform conversion between a radio frequency signal and a baseband signal, for example, configured to send the signaling message in the foregoing embodiment to a terminal device. The BBU 202 is mainly configured to: perform baseband processing, control the base station, and so on. The RRU 201 and the BBU 202 may be physically disposed together, or may be physically separated, in other words, are distributed base stations.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to perform the operation procedure of the network device in the foregoing method embodiment.

In an example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store a necessary instruction and necessary data. For example, the memory 2021 stores information in the foregoing embodiments. The processor 2022 is configured to control the base station to perform a necessary action, for example, is configured to control the base station to perform the operation procedure related to the network device in the foregoing method embodiments. The memory 2021 and the processor 2022 may serve one or more boards. In other words, each board is provided with a memory and a processor. Alternatively, a plurality of boards may share a same memory and a same processor. In addition, each board may further be provided with a necessary circuit.

According to the method provided in the embodiments of this application, an embodiment of this application further provides a communications system. The system includes the foregoing network device and one or more terminal devices.

It should be understood that in the embodiment of this application, the processor may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory.

The bus system may further include a power bus, a control bus, a status signal bus, and the like, in addition to a data bus. However, for clear description, various types of buses in the figure are marked as the bus system.

In an implementation process, the steps in the foregoing methods may be completed using an integrated logic circuit of hardware in the processor, or using an instruction in a form of software. The steps of the method disclosed with reference to the embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be further understood that first, second, third, fourth, and various reference numerals in this specification are merely distinguished for ease of description, and are not intended to limit the scope of the embodiments of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "!" in this specification generally indicates an "or" relationship between the associated objects.

It should be understood that sequence numbers of the foregoing processes in the embodiments of this application do not mean execution sequences. The execution sequences of the processes should be determined based on functions and internal logic of the processes, and should not constitute any limitation to implementation processes of the embodiments of this application.

A person of ordinary skill in the art may be aware that illustrative logical blocks (illustrative logical block) and steps (step) described in combination with the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working processes of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising a processor and a memory, wherein
    the memory is configured to store an instruction; and
    the processor is configured to execute the instruction in the memory, to cause the apparatus perform the following
    receiving configuration information, wherein the configuration information comprises association information, for a first carrier, between a first resource and a first entity, and the first entity includes at least one of a first HARQ entity, a first MAC entity, or a first RLC entity;
    receiving first data, and determining that the first data corresponds to the first resource; and
    determining, based on the configuration information and the first resource that corresponds to the first data, the first entity corresponding to the first data;
    wherein the configuration information further comprises second association information, for the first carrier, between a second resource and a second entity, and the second entity includes at least one of a second HARQ entity, a second MAC entity, or a second RLC entity; and
    a first network device and a second network device exchange an interaction message for the configuration information to avoid occupying a same HAW process.

2. The apparatus according to claim 1, wherein the first resource comprises at least one of a first control channel resource, a first antenna port, a first control channel scrambling resource, a first transport block, a first HARQ process, a first group of HARQ processes, or a first connection identifier.

3. The apparatus according to claim 1, wherein the first resource comprises a first group of HARQ processes, and the association information between the first resource and the first entity comprises a group identifier of the first group of HARQ processes corresponding to the first entity; and the determining that the first data corresponds to the first resource comprises:

determining, based on that received control information for scheduling the first data comprises a group identifier of a first group of HARQ processes or a process identification of an HARQ process used for the first data belongs to a first group of process identifications, that the first data corresponds to the first group of HARQ processes, wherein the group identifier of the first group of HARQ processes is used to indicate the first group of HARQ processes.

4. The apparatus according to claim 1, wherein the first resource comprises a first HARQ process, and the association information between the first resource and the first entity comprises a process identification of the first HARQ process corresponding to the first entity; and the determining that the first data corresponds to the first resource comprises:

determining, based on that received control information for scheduling the first data comprises the process identification of the first HARQ process or a process identification of an HARQ process used for the first data is the process identification of the first HARQ process, that the first data corresponds to the first HARQ process, wherein the process identification of the first HARQ process is used to indicate the first HARQ process.

5. The apparatus according to claim 1, wherein the first resource comprises a first antenna port, and the association information between the first resource and the first entity comprises the first antenna port corresponding to the first entity; and the determining that the first data corresponds to the first resource comprises:

determining, based on that received control information for scheduling the first data comprises indication information of the first antenna port or an antenna port used for the first data is the first antenna port, that the first data corresponds to the first antenna port, wherein the indication information of the first antenna port is used to indicate the first antenna port.

6. The apparatus according to claim 1, wherein the first resource comprises a first transport block, and the association information between the first resource and the first entity comprises the first transport block corresponding to the first entity; and the determining that the first data corresponds to the first resource comprises:

determining, based on that received control information for scheduling the first data comprises indication information of the first transport block or a transport block corresponding to the first data is the first transport block, that the first data corresponds to the first transport block, wherein the indication information of the first transport block is used to indicate the first transport block.

7. The apparatus according to claim 1, wherein the first resource a first connection identifier, and the association information between the first resource and the first entity comprises the first connection identifier corresponding to the first entity; and the determining that the first data corresponds to the first resource comprises:

determining, based on that received control information for scheduling the first data comprises indication information of the first connection identifier or the first data is from an entity corresponding to the first connection identifier, that the first data corresponds to the first connection identifier, wherein the indication information of the first connection identifier is used to indicate the first connection identifier.

8. The apparatus according to claim 1, wherein the receiving first data comprises: receiving the first data by using at least one resource of the first HARQ process, the first group of HAW processes, the first antenna port, the first transport block, or the first connection identifier.

9. The apparatus according to claim 1, wherein the first resource comprises a first control channel scrambling resource, and the association information between the first resource and the first entity comprises the first control channel scrambling resource corresponding to the first entity; and the determining that the first data corresponds to the first resource comprises:

determining, based on that a first control channel resource for descrambling and scheduling the first data is the first control channel scrambling resource, that the first data corresponds to the first control channel scrambling resource.

10. The apparatus according to claim 9, wherein the receiving first data comprises:

receiving the first data based on scheduling of a control channel corresponding to the first control channel scrambling resource.

11. The apparatus according to claim 1, wherein the first resource comprises a first control channel resource, and the association information between the first resource and the first entity comprises the first control channel resource corresponding to the first entity; and the determining that the first data corresponds to the first resource comprises:

determining, based on that a received resource used by a first control channel to schedule the first data is the first control channel resource, that the first data corresponds to the first control channel resource.

12. The apparatus according to claim 11, wherein the receiving first data comprises:

receiving the first data based on scheduling of the first control channel corresponding to the first control channel resource.

13. The apparatus according to claim 1, wherein the second resource and the first resource are resources of a same type, but the second resource is different from the first resource.

14. A communication method, comprising:

receiving, by a terminal device, configuration information, wherein the configuration information comprises association information, for a first carrier, between a first resource and a first entity, and the first entity includes at least one of a first HARQ entity, a first MAC entity, or a first RLC entity;

receiving, by the terminal device, first data, and determining that the first data corresponds to the first resource; and determining, by the terminal device based on the configuration information and the first resource that corresponds to the first data, the first entity corresponding to the first data;
wherein the configuration information further comprises second association information, for the first carrier, between a second resource and a second entity, and the second entity includes at least one of a second HARQ entity, a second MAC entity, or a second RLC entity; and
a first network device and a second network device exchange an interaction message for the configuration information to avoid occupying a same HARQ process.

15. The method according to claim 14, wherein the first resource comprises at least one of a first control channel resource, a first antenna port, a first control channel scrambling resource, a first transport block, a first HARQ process, a first group of HARQ processes, or a first connection identifier.

16. The method according to claim 14, wherein the first resource comprises a first group of HARQ processes, and the association information between the first resource and the first entity comprises a group identifier of the first group of HARQ processes corresponding to the first entity; and
the determining that the first data corresponds to the first resource comprises:
determining, by the terminal device based on that received control information for scheduling the first data comprises a group identifier of a first group of HARQ processes or a process identification of an HARQ process used for the first data belongs to a first group of process identifications, that the first data corresponds to the first group of HARQ processes, wherein the group identifier of the first group of HARQ processes is used to indicate the first group of HARQ processes.

17. The method according to claim 14, wherein the first resource comprises a first HARQ process, and the association information between the first resource and the first entity comprises a process identification of the first HARQ process corresponding to the first entity; and
the determining that the first data corresponds to the first resource comprises:
determining, by the terminal device based on that received control information for scheduling the first data comprises the process identification of the first HARQ process or a process identification of an HARQ process used for the first data is the process identification of the first HARQ process, that the first data corresponds to the first HARQ process, wherein the process identification of the first HARQ process is used to indicate the first HARQ process.

18. The method according to claim 14, wherein the first resource comprises a first antenna port, and the association information between the first resource and the first entity comprises the first antenna port corresponding to the first entity; and
the determining that the first data corresponds to the first resource comprises:
determining, by the terminal device based on that received control information for scheduling the first data comprises indication information of the first antenna port or an antenna port used for the first data is the first antenna port, that the first data corresponds to the first antenna port, wherein the indication information of the first antenna port is used to indicate the first antenna port.

19. The method according to claim 14, Wherein the first resource comprises a first transport block, and the association information between the first resource and the first entity comprises the first transport block corresponding to the first entity, and
the determining that the first data corresponds to the first resource comprises:
determining, by the terminal device based on that received control information for scheduling the first data comprises indication information of the first transport block or a transport block corresponding to the first data is the first transport block, that the first data corresponds to the first transport block, wherein the indication information of the first transport block is used to indicate the first transport block.

* * * * *